(12) United States Patent
Yoshimori et al.

(10) Patent No.: US 12,473,448 B2
(45) Date of Patent: Nov. 18, 2025

(54) RECORDING METHOD, AND INK COMPOSITION USED IN RECORDING METHOD

(71) Applicant: DNP FINE CHEMICALS CO., LTD., Yokohama (JP)

(72) Inventors: Keishiro Yoshimori, Yokohama (JP); Yuka Orikasa, Yokohama (JP); Kisei Matsumoto, Yokohama (JP); Koujun Utaka, Yokohama (JP); Mitsuyoshi Tamura, Yokohama (JP); Fumie Yamazaki, Yokohama (JP); Naoki Shiraishi, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 64 days.

(21) Appl. No.: 18/028,587

(22) PCT Filed: Sep. 30, 2021

(86) PCT No.: PCT/JP2021/036071
§ 371 (c)(1),
(2) Date: Mar. 27, 2023

(87) PCT Pub. No.: WO2022/071478
PCT Pub. Date: Apr. 7, 2022

(65) Prior Publication Data
US 2023/0340287 A1    Oct. 26, 2023

(30) Foreign Application Priority Data

Sep. 30, 2020   (JP) .................................. 2020-166606

(51) Int. Cl.
*C09D 11/36* (2014.01)
*B41J 2/165* (2006.01)
(Continued)

(52) U.S. Cl.
CPC ............... *C09D 11/36* (2013.01); *B41J 2/175* (2013.01); *B41J 2/2114* (2013.01); *B41M 5/00* (2013.01);
(Continued)

(58) Field of Classification Search
CPC ....... C09D 11/322; C09D 11/36; C09D 11/40; C09D 11/037; C09D 11/30; C09D 11/38;
(Continued)

(56) References Cited

U.S. PATENT DOCUMENTS

2009/0115817 A1   5/2009 Suzuki
2018/0281416 A1*  10/2018 Clark .................. B41J 2/16505
(Continued)

FOREIGN PATENT DOCUMENTS

JP    S56-143274 A    11/1981
JP    S60-232962 A    11/1985
(Continued)

OTHER PUBLICATIONS

Nov. 30, 2021 International Search Report issued in International Patent Application No. PCT/JP2021/036071.
(Continued)

*Primary Examiner* — Jannelle M Lebron
(74) *Attorney, Agent, or Firm* — Oliff PLC

(57) ABSTRACT

A recording method for discharging, onto the surface of a substrate, an inkjet ink composition containing an organic solvent by using an inkjet head provided with constituent members bonded by a cured product of an adhesive, the organic solvent containing the following organic solvent (a). Organic solvent (a): at least one substance selected from the group consisting of alkylamide-based solvents (a1), cyclic amide-based solvents (a2), and lactone-based solvents (a3).

15 Claims, 1 Drawing Sheet

(51) Int. Cl.
  *B41J 2/175* (2006.01)
  *B41J 2/21* (2006.01)
  *B41M 5/00* (2006.01)

(52) U.S. Cl.
  CPC .......... *B41J 2/16508* (2013.01); *B41J 2/2117* (2013.01); *B41J 2202/12* (2013.01); *B41M 2205/20* (2013.01)

(58) Field of Classification Search
  CPC . B41J 2/01; B41J 2/16505; B41J 2/175; B41J 2202/12
  See application file for complete search history.

(56) References Cited

U.S. PATENT DOCUMENTS

| | | | |
|---|---|---|---|
| 2019/0061382 A1 | 2/2019 | Okuda et al. | |
| 2019/0283427 A1* | 9/2019 | Sameshima | B41J 2/1612 |
| 2020/0040207 A1 | 2/2020 | Otomo et al. | |

FOREIGN PATENT DOCUMENTS

| | | |
|---|---|---|
| JP | H04-202572 A | 7/1992 |
| JP | 2001-301178 A | 10/2001 |
| JP | 2006-168341 A | 6/2006 |
| JP | 2008-73983 A | 4/2008 |
| JP | 2008-208171 A | 9/2008 |
| JP | 2009-113263 A | 5/2009 |
| JP | 2009-148965 A | 7/2009 |
| JP | 2009-192879 A | 8/2009 |
| JP | 2012-46671 A | 3/2012 |
| JP | 2012-232418 A | 11/2012 |
| JP | 2013-18853 A | 1/2013 |
| JP | 2013-059966 A | 4/2013 |
| JP | 2015-7206 A | 1/2015 |
| JP | 2015-120778 A | 7/2015 |
| JP | 2015-182233 A | 10/2015 |
| JP | 2015-196731 A | 11/2015 |
| JP | 6151662 B2 | 6/2017 |
| JP | 2017-186494 A | 10/2017 |
| JP | 2017-186505 A | 10/2017 |
| JP | 2018-154118 A | 10/2018 |
| JP | 2019-42982 A | 3/2019 |
| JP | 2020-166606 A | 10/2020 |
| WO | 2009/101708 A1 | 8/2009 |
| WO | 2018/181528 A1 | 10/2018 |

OTHER PUBLICATIONS

Jun. 1, 2021 Notice of Reasons for Refusal issued in Japanese Patent Application No. 2021-031691.
Nov. 9, 2021 Notice of Reasons for Refusal issued in Japanese Patent Application No. 2021-160282.
Jan. 6, 2022 Notice of Reasons for Refusal issued in Japanese Patent Application No. 2021-160282.
Feb. 1, 2022 Notice of Reasons for Refusal issued in JP Application No. 2022-001931.
Jun. 7, 2022 Notice of Reasons for Refusal issued in Japanese Patent Application No. 2021-160282.
Aug. 2, 2022 Notice of Reasons for Refusal issued in Japanese Patent Application No. 2022-001931.
Oct. 4, 2024 Extended European Search Report issued in European Patent Application No. 21875774.8.

* cited by examiner

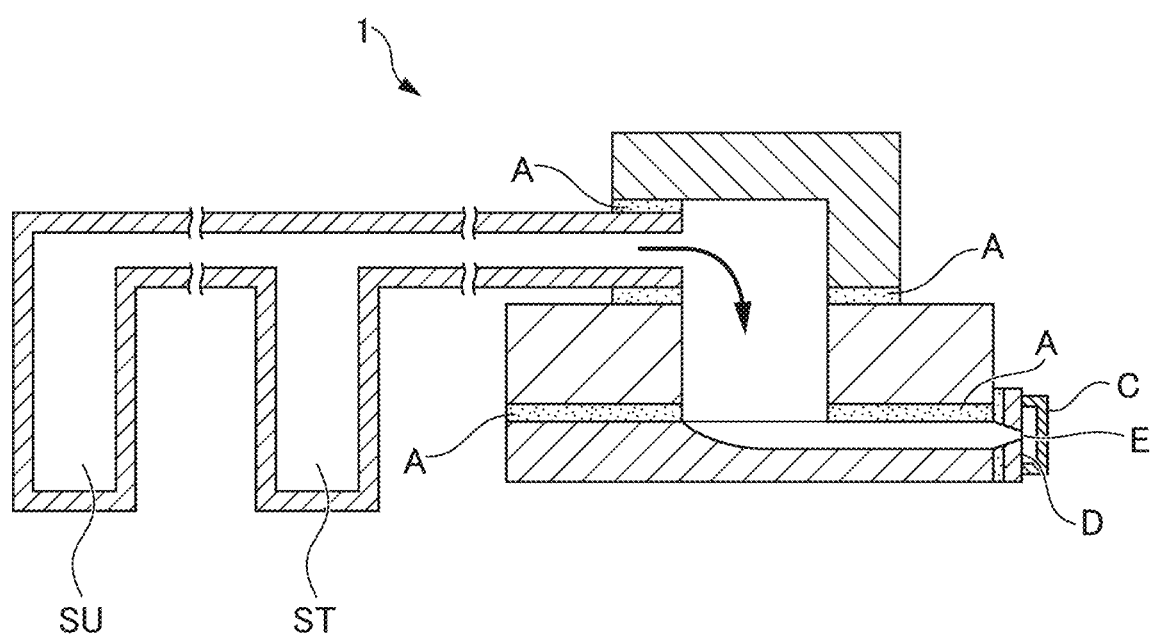

RECORDING METHOD, AND INK COMPOSITION USED IN RECORDING METHOD

TECHNICAL FIELD

The present invention relates to a recording method and an ink composition for use in the recording method.

BACKGROUND ART

Ink compositions widely used include aqueous ink compositions, which include water or a mixture of water and an organic solvent and a colorant dissolved or dispersed therein, and nonaqueous ink compositions, which include a water-free organic solvent and a colorant dissolved or dispersed therein.

For example, Patent Document 1 discloses a nonaqueous or aqueous inkjet ink composition including a colorant and an alkoxyalkylamide solvent, such as 3-methoxy-N,N-dimethylpropanamide. Patent Document 1 states that the ink composition is suitable for use in printing on the surfaces of resin media and other media.

Such a inkjet ink composition is ejected from inkjet heads onto the surfaces of substrates during actual recording (printing). For example, Patent Document 2 discloses a technology on inkjet heads, which includes using a specific adhesive to bond inkjet head components. Patent Document 2 discloses that such an adhesive does not swell upon exposure to ink compositions, is curable at temperatures that do not affect the piezoelectricity of piezoelectric devices, and can form a coating film with an easily controllable thickness.

Patent Document 1: Japanese Unexamined Patent Application, Publication No. 2012-046671
Patent Document 2: Japanese Unexamined Patent Application, Publication No. 2001-301178

DISCLOSURE OF THE INVENTION

Problems to be Solved by the Invention

When ejected from inkjet heads onto the surfaces of substrates, the alkoxyalkylamide solvent-containing ink composition mentioned above will provide recorded products (prints) with high image quality and less blurring.

Unfortunately, the 3-methoxy-N,N-dimethylpropanamide-containing ink composition may erode a cured adhesive material when it passes through inkjet heads and comes into contact with the cured adhesive material, although it is less likely to cause print blurring. This may result in a reduction in the ejection stability of the ink composition, which may make it impossible to eject the ink composition onto the desired position on the surfaces of substrates and thus make it impossible to obtain desired recorded products (prints).

It is an object of the present invention to provide a recording method capable of producing prints with less blurring like a recording method using an alkoxyalkylamide solvent-containing ink composition and capable of being performed in such a way as to effectively prevent the erosion of a cured adhesive material used to bond inkjet head components.

Means for Solving the Problems

As a result of intensive studies for solving the problem, the inventors have completed the present invention based on findings that a recording method including ejecting a specific organic solvent-containing, ink composition onto the surfaces of substrates provides a solution to the problem. Specifically, the present invention provides the following aspects.

(1) A recording method including ejecting an organic solvent-containing, inkjet ink composition onto a surface of a substrate from an inkjet head including components bonded together with a cured adhesive material, the organic solvent including:

an organic solvent (a) that is at least one selected from the group consisting of an alkylamide solvent (a1), a cyclic amide solvent (a2), and a lactone solvent (a3).

(2) The recording method according to aspect (1), wherein the adhesive used to bond the components of the inkjet head includes an epoxy adhesive.

(3) The recording method according to aspect (1) or (2), wherein the inkjet head includes a member that covers a face of an ejection port for ejecting the ink composition.

(4) The recording method according to any one of aspects (1) to (3), wherein an ink storage mechanism is provided between a ink supply unit supplying the ink composition and the inkjet head.

(5) A method for producing a recorded product, the method including ejecting an organic solvent-containing, inkjet ink composition onto a surface of a substrate from an inkjet head including components bonded together with a cured adhesive material, the organic solvent including:

an organic solvent (a) that is at least one selected from the group consisting of an alkylamide solvent (a1), a cyclic amide solvent (a2), and a lactone solvent (a3).

(6) A inkjet ink composition to be ejected onto a surface of a substrate from an inkjet head including components bonded together with a cured adhesive material, the ink composition including an organic solvent, the organic solvent including: an organic solvent (a) that is at least one selected from the group consisting of an alkylamide solvent (a1), a cyclic amide solvent (a2), and a lactone solvent (a3).

(7) The ink composition according to aspect (6), wherein the organic solvent (a) is the alkylamide solvent (a1).

(8) The ink composition according to aspect (7), wherein the alkylamide solvent (a1) is represented by formula (1):

[Chem. 1]

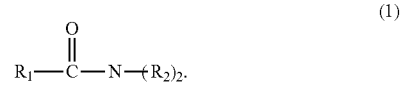

where $R_1$ represents hydrogen or an alkyl group having one or more and four or less carbon atoms, and $R_2$ represents an alkyl group having two or more and four or less carbon atoms.

(9) The ink composition according to aspect (8), wherein the alkylamide solvent (a1) includes at least one selected from the group consisting of N,N-diethylformamide, N,N-diethylpropanamide, and N,N-diethylacetamide.

(10) The ink composition according to aspect (6), wherein the organic solvent (a) is the cyclic amide solvent (a2).

(11) The ink composition according to aspect (10), wherein the cyclic amide solvent (a2) is represented by formula (2):

[Chem. 2]

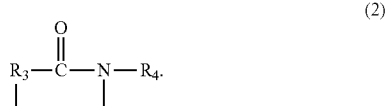

where $R_3$ represents an alkylene group having four or more and five or less carbon atoms, and $R_4$ represents hydrogen, an alkyl group having one or more and two or less carbon atoms, or an unsaturated hydrocarbon group.

(12) The ink composition according to aspect (11), wherein the cyclic amide solvent (a2) includes at least one selected from the group consisting of ε-caprolactam, N-methylcaprolactam, and N-vinylcaprolactam.

(13) The ink composition according to aspect (6), wherein the organic solvent (a) is the lactone solvent (a3).

(14) The ink composition according to aspect (13), wherein the lactone solvent (a3) is represented by formula (3):

[Chem. 3]

where $R_5$ represents an alkylene group having three or more and five or less carbon atoms, and $R_6$ represents hydrogen or an alkyl group having one or more and two or less carbon atoms.

(15) The ink composition according to aspect (14), wherein the lactone solvent (a3) includes at least one selected from the group consisting of γ-butyrolactone, γ-valerolactone, δ-valerolactone, δ-hexanolactone, and ε-caprolactone.

Effects of the Invention

In the recording method of the present invention, print blurring is less likely to occur during the ejection of the ink composition onto the surface of the substrate, and the ink composition does not erode the cured adhesive material used to bond components of the inkjet head, which leads to prevention of a reduction in the ejection stability of the ink composition and leads to effective prevention of the failure of ejection of the ink composition onto the desired position on the surface of the substrate.

BRIEF DESCRIPTION OF THE DRAWINGS

FIG. 1 is a schematic diagram (cross-sectional view) showing an example of an inkjet head used in a recording method according to an embodiment of the present invention.

PREFERRED MODE FOR CARRYING OUT THE INVENTION

Hereinafter, specific embodiments of the present invention will be described in detail. It will be understood that the embodiments described below are not intended to limit the present invention and may be altered or modified as appropriate for implementation without departing from the gist of the present invention.

Recording Method

An embodiment of the present invention is directed to a recording method including ejecting an organic solvent-containing, inkjet ink composition onto a surface of a substrate from an inkjet head including components bonded together with a cured adhesive material. A feature of the recording method is that the ink composition contains at least one organic solvent (organic solvent (a)) selected from the group consisting of an alkylamide solvent (a1), a cyclic amide solvent (a2), and a lactone solvent (a3).

In the recording method with such a feature, print blurring is less likely to occur during the ejection of the ink composition onto the surface of the substrate, and the ink composition does not erode the cured adhesive material, which leads to prevention of a reduction in the ejection stability of the ink composition and leads to effective prevention of the failure of ejection of the ink composition onto the desired position on the surface of the substrate.

The ink composition containing at least one organic solvent (organic solvent (a)) selected from the group consisting of an alkylamide solvent (a1), a cyclic amide solvent (a2), and a lactone solvent (a3) is less likely to cause print blurring and thus enables recording on a recording medium (substrate) being fed at high speed.

Specifically, the maximum recording speed which the recording method according to this embodiment can reach is preferably 10 $m^2/h$ or more, more preferably 15 $m^2/h$ or more, even more preferably 20 $m^2/h$ or more, although it depends on the type of the substrate, the type of the inkjet recording device, or other factors. Moreover, the maximum recording speed which the recording method according to this embodiment can reach is preferably 70 $m^2/h$ or less, more preferably 65 $m^2/h$ or less, even more preferably 60 $m^2/h$ or less.

The recording on the recording medium (substrate) being fed at a high speed is preferably performed using a heating mechanism to control the surface temperature of the substrate. This enables the ink composition to dry more quickly after it is landed on the substrate (recording medium) and thus reduces the occurrence of print blurring to an extremely low level.

The heating mechanism may heat the substrate surface to any temperature at which the organic solvent will volatilize from the ink composition. The surface temperature of the substrate preferably has a lower limit of 20° C. or more, more preferably 30° C. or more, even more preferably 40° C. or more. The surface temperature of the substrate preferably has an upper limit of 70° C. or less, more preferably 60° C. or less, even more preferably 50° C. or less.

Hereinafter, an example of the configuration of an inkjet recording device useful for implementing the recording method according to this embodiment will be described. An example of the configuration of the inkjet recording device will be described with respect to an on-carriage type serial printer. Alternatively, however, the inkjet recording device useful for implementing the recording method according to this embodiment may be an off-carriage type with an ink cartridge fixed outside or a line printer type having stationary inkjet heads for ejecting the ink composition onto the recording medium (substrate).

Inkjet Recording Device

The inkjet recording device may be an on-carriage type inkjet recording device including: a carriage; an inkjet head; an ink cartridge (ink supply unit) mounted on the carriage;

a supply mechanism that supplies the ink composition from the cartridge to the inkjet head; and a connection part that connects the ink cartridge (ink supply unit) and the inkjet head.

In the inkjet recording device, the inkjet head is mounted on the carriage, which moves in a given direction, and the inkjet head moves along with the carriage and ejects the ink composition onto the recording medium (substrate).

The ink composition in the ink cartridge may be of any desired color, such as yellow, magenta, cyan, black, light magenta, light cyan, light black, orange, green, red, or white. Colors may be printed in any order using heads in any positions with any configuration.

Hereinafter, the components of the inkjet recording device will be described.

Inkjet Head

The inkjet head is a component of the inkjet recording device and is configured to eject the ink composition onto the surface of the substrate. FIG. 1 is a schematic diagram showing an example of the inkjet head. The inkjet head 1 is configured to receive the supply of the ink composition from the ink cartridge (ink supply unit SU) and to eject the ink composition onto the surface of the substrate (recording medium) from an ejection port face D.

As a non-limiting example, the inkjet head 1 may be a piezoelectric inkjet head including a piezoelectric device or a thermal inkjet head including a heating element.

The inkjet head 1 preferably includes a component (e.g., a head cap) C that covers the face D of the ejection port for ejecting the ink composition. Such a component C prevents drying of the ejection port face D, which leads to prevention of a reduction in intermittent ejection performance, and prevents absorption of the ink composition into the ejection port face, which leads to prevention of a reduction in ejection stability.

The covering of the ejection port face also makes the organic solvent (a) much less volatile in the channel since the organic solvent (a) inherently has low volatility in the channel. Thus, higher intermittent ejection performance will be achieved when the organic solvent (a)-containing ink composition is ejected from the inkjet head including the component that covers the ejection port face.

Specifically, in a case where a heating mechanism is provided to rapidly dry the ink composition, the heating mechanism may make the ink composition easily dry in the vicinity of the ejection port E even during the standby period when the inkjet ejection is not performed. During the standby period when the inkjet ejection is not performed, the component that covers the ejection port face D prevents drying of the ink composition in the vicinity of the ejection port E and thus prevents a reduction in intermittent ejection performance. Moreover, the heating mechanism enables quick drying of the ink composition landed on the substrate (recording medium) and thus enables extremely high-speed production of recorded products.

The intermittent ejection performance-increasing effect cannot be sufficiently achieved when a conventional, alkoxyalkylamide solvent-containing, ink composition is ejected onto the surface of the substrate from the inkjet head 1 including the component that covers the ejection port face D. In other words, the use of the organic solvent (a)-containing ink composition is significantly effective in increasing the intermittent ejection performance in the case where the ink composition is ejected onto the surface of the substrate from the inkjet head including the member that covers the ejection port face.

As shown in FIG. 1, the inkjet head includes components bonded together with a cured adhesive material A. The ink composition comes into contact with the cured adhesive material A when it passes through the interior of the inkjet head. The recording method according to this embodiment, which includes ejecting the specified ink composition onto the recording medium (substrate), can be performed in such a way as to prevent a reduction in the ejection stability of the ink composition and as to effectively prevent the failure of ejection of the ink composition onto the desired position on the surface of the substrate. Hereinafter, the adhesive used as a component of the inkjet heat will be described.

Adhesive

The adhesive is suitable for bonding at least two components of an inkjet head, such as a piezoelectric device-equipped inkjet head or a heating element-equipped thermal inkjet head.

The adhesive for bonding components of the inkjet head may be any suitable type, such as an adhesive including an epoxy resin, a urethane resin, a silicone resin, a vinyl acetate resin, or an acrylic resin. In particular, the adhesive is preferably an adhesive including an epoxy resin. The epoxy resin has a strong adhesion strength and provides strong bonding between components of the inkjet head. Moreover, the organic solvent (a)-containing ink composition hardly erodes or swells the cured epoxy resin material. Thus, from the inkjet head including components bonded together with the epoxy resin adhesive, the ink composition can be ejected with higher stability onto the surface of the substrate. Hereinafter, the adhesive including the epoxy resin will be described, which is useful for bonding inkjet head components.

The epoxy resin in the adhesive is typically, for example, a bisphenol epoxy resin, such as that represented by structural formula (4) below, a phenol novolac epoxy resin, such as that represented by structural formula (5) below, or a cresol novolac epoxy resin, such as that represented by structural formula (6) below (in the formulas, n is 0 to 10).

[Chem. 4]

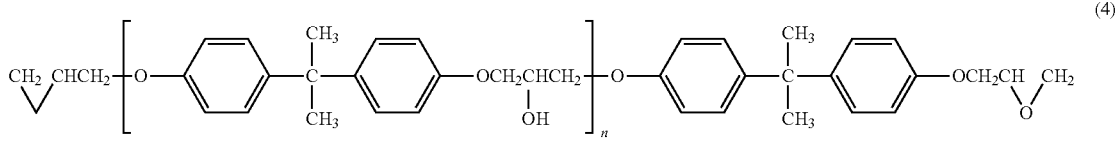

(4)

[Chem. 5]

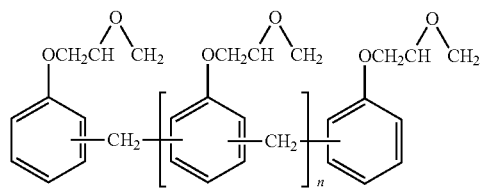

(5)

[Chem. 6]

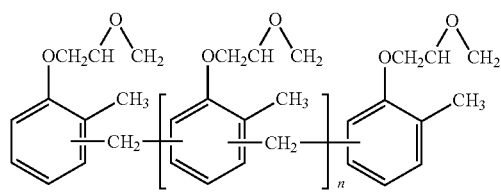

(6)

The skeleton of the epoxy resin may be bisphenol A as shown in structural formula (4) or any other structure known for main components of conventional epoxy resin adhesives, such as tetrabromobisphenol A, bisphenol F, bisphenol AD, or bisphenol Z.

The epoxy resin in the adhesive should not be limited to the typical epoxy resin shown above and may be any resin having an epoxy-containing side chain(s).

When used in combination with a curing agent, such as an amine curing agent, an acid anhydride curing agent, or a phenolic curing agent, the epoxy resin will undergo polymerization reaction to form a cured material.

When the adhesive includes the epoxy adhesive, the content of the epoxy resin in the cured adhesive material may be 10 mass % or more and is preferably 30 mass % or more, more preferably 50 mass % or more, even more preferably 70 mass % or more, furthermore preferably 90 mass % or more, most preferably 99 mass % or more, based on the total mass of the cured adhesive material.

Ink Storage Mechanism

An ink storage mechanism ST, which is distinct from the ink cartridge, is preferably provided between the ink cartridge and the inkjet head. The ink storage mechanism ST is a mechanism that temporarily stores the ink composition being supplied from the ink cartridge. The ink storage mechanism ST helps to further increase the stability of ejection of the ink composition. To eject the ink composition onto the surface of the substrate, however, the recording method of the present invention may be performed using an inkjet recording device with no ink storage mechanism.

During the inkjet ejection of the ink composition, the pressure on the ink composition in the channel might be unstable due to slight permeation of the organic solvent (a) into components of the inkjet head or channel (tube). The ink storage mechanism ST provided between the ink supply unit SU and the inkjet head helps to stabilize the pressure in the channel and thus to further increase the ejection stability of the ink composition.

Specifically, high-speed printing may tend to destabilize the ink ejection pressure due to the high feed rate of the carriage, although the recording method according to this embodiment can be performed with less blurring of print even when the recording medium (substrate) is fed at high speed during the recording. In this regard, the use of the inkjet recording device having the ink storage mechanism between the ink supply unit and the inkjet head helps to stabilize the ink ejection pressure and to maintain the ejection stability of the ink composition during the ejection of the ink composition onto the surface of the substrate.

The ink storage mechanism may be what is called a sub-tank for storing the ink composition or a damper mechanism for absorbing fluctuations in the pressure on the ink composition in the inkjet head.

Heating Mechanism

The inkjet recording device preferably includes a heating mechanism (drying mechanism). The heating mechanism is a mechanism that increases the temperature of the substrate surface to heat and dry the ink composition landed on the substrate (recording medium).

The heating mechanism provided in the inkjet recording device may be a mechanism that is provided in direct contact with the substrate to heat the substrate, such as a pre-heater, a platen heater, or an after-heater, or may be a mechanism that heats the recorded product by blowing warm air over the recorded product or by irradiating the recorded product with, for example, infrared rays. Two or more of these heating mechanisms may also be used in combination.

Other Mechanisms

The inkjet recording device may include conventionally known mechanisms in addition to the mechanisms described above. For example, the inkjet recording device may or may not include a recording medium (substrate) winding mechanism or an ink circulating mechanism.

Next, an example of the ink composition useful for implementing the recording method according to this embodiment will be described.

Ink Composition

The ink composition used in the recording method according to this embodiment is a inkjet ink composition containing at least one organic solvent (organic solvent (a)) selected from the group consisting of an alkylamide solvent (a1), a cyclic amide solvent (a2), and a lactone solvent (a3).

The ink composition used in the recording method according to this embodiment may be an aqueous ink composition including: a mixture of water and an organic solvent; and a colorant dissolved or dispersed therein, an active energy ray-curable ink composition including a polymerizable monomer, or a nonaqueous ink composition that does not intentionally contain water.

Hereinafter, a nonaqueous ink composition (oil-based ink composition), which contains no water, and an aqueous ink composition, which contains water as a main component, will be described, which are for use in the recording method according to this embodiment. Nonaqueous ink compositions, which do not contain water but contain an organic solvent as a main component, are considered more likely to erode the cured adhesive material used to bond components in the inkjet head. Such nonaqueous ink compositions tend to cause the problem to be addressed by the present invention. In this regard, the organic solvent (a) in the nonaqueous ink composition is effective in preventing the erosion of the cured adhesive material used to bond components in the inkjet head.

Nonaqueous Ink Composition

An embodiment of the present invention is directed to a nonaqueous ink composition that contains an organic solvent as a liquid medium and does not intentionally contain water.

As used herein, the phrase "does not intentionally contain water" implies that unintentional addition of water from the air, additives, or other sources should not be taken into account. The nonaqueous ink composition according to this embodiment preferably has a water content of 5.0 mass % or less, more preferably 3.0 mass % or less, even more preferably 1.0 mass % or less, furthermore preferably 0.5 mass % or less, based on the total mass of the nonaqueous ink composition. This ink composition can be ejected with improved stability without causing troubles, such as clogging by the ink composition in the inkjet head. Moreover, this nonaqueous ink composition can dry rapidly and enables easy printing (recording) on non-absorbable substrates, such as resin substrates and metal substrates.

Hereinafter, each of the components in the nonaqueous ink composition according to this embodiment will be described.

Organic Solvent

The nonaqueous ink composition contains an organic solvent (a).

The organic solvent (a) is at least one selected from the group consisting of an alkylamide solvent (a1), a cyclic amide solvent (a2), and a lactone solvent (a3). Hereinafter, each of the organic solvent (a) and additional organic solvents that may be contained in the nonaqueous ink composition will be more specifically described.

Organic Solvent (a)

The organic solvent (a) is at least one selected from the group consisting of an alkylamide solvent (a1), a cyclic amide solvent (a2), and a lactone solvent (a3). The nonaqueous ink composition contains at least one selected from the group consisting of an alkylamide solvent (a1), a cyclic amide solvent (a2), and a lactone solvent (a3). Such an organic solvent (a) does not have a high ability to permeate into resins and thus does not erode the cured adhesive material used to bond components in the inkjet head. Thus, the ink composition has higher ejection stability and can be ejected onto the desired position on the surface of the substrate.

While the organic solvent (a) slightly permeates into the substrate, it dries rapidly on the substrate surface. Thus, the organic solvent (a)-containing ink composition enables clear printing (recording) with less blurring. The less-blurring printing effect cannot be achieved simply by selecting a low-boiling-point solvent for increasing the ability to dry.

Hereinafter, each of the alkylamide solvent (a1), the cyclic amide solvent (a2), and the lactone solvent (a3), which are added as the organic solvent (a), will be described.

(1) Alkylamide Solvent

The alkylamide solvent includes a compound including: a hydrogen atom or an alkyl group ($C_nH_{2n+1}$—); and a —C(=O)—N— group (amide bond). For example, the alkylamide solvent to be used preferably has the structure below.

[Chem. 7]

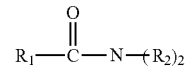

(1)

In formula (1), $R_1$ represents hydrogen or an alkyl group having one or more and four or less carbon atoms, and $R_2$ represents an alkyl group having two or more and four or less carbon atoms.

Examples of the alkylamide solvent include N,N-diethylformamide, N,N-diethylacetamide, N,N-dipropylformamide, N,N-dibutylformamide, N,N-diethylpropanamide, and N,N-dipropylpropanamide. To make the present invention particularly advantageous, the nonaqueous ink composition preferably contains at least one selected from the group consisting of N,N-diethylformamide, N,N-diethylpropanamide, and N,N-diethylacetamide.

The nonaqueous ink composition may contain N,N-dimethylformamide or N,N-dimethylacetamide. To make the present invention particularly advantageous, however, it is preferred to exclude N,N-dimethylformamide and N,N-dimethylacetamide.

(2) Cyclic Amide Solvent

The cyclic amide solvent is a solvent having a —C(=O)—N— group-containing cyclic structure. For example, the cyclic amide solvent to be used preferably has the structure below.

[Chem. 8]

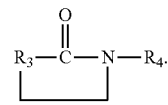

(2)

In formula (2), $R_3$ represents an alkylene group having four or more and five or less carbon atoms, and $R_4$ represents hydrogen, an alkyl group having one or more and two or less carbon atoms, or an unsaturated hydrocarbon group.

Examples of the cyclic amide solvent include N-methylcaprolactam, N-acetylcaprolactam, ε-caprolactam, N-vinylcaprolactam, 2-pyrrolidone, N-methyl-2-pyrrolidone, N-ethyl-2-pyrrolidone, N-propyl-2-pyrrolidone, N-ethyl-ε-caprolactam, N-propyl-ε caprolactam, and N-methyl-ε-caprolactam. Among them, the nonaqueous ink composition preferably contains at least one selected from the group consisting of ε-caprolactam, N-methylcaprolactam, and N-vinylcaprolactam.

The nonaqueous ink composition may contain N-methyl-2-pyrrolidone, N-ethyl-2-pyrrolidone, 1,3-dimethyl-2-imidazolidinone, or N-methyloxazolidinone. To make the present invention particularly advantageous, however, it is preferred to exclude N-methyl-2-pyrrolidone, N-ethyl-2-pyrrolidone, 1,3-dimethyl-2-imidazolidinone, and N-methyloxazolidinone.

(3) Lactone Solvent

The lactone solvent is a solvent having a cyclic ester structure. For example, the lactone solvent to be used preferably has the structure below.

[Chem. 9]

(3)

In formula (3), $R_5$ represents an alkylene group having three or more and five or less carbon atoms, and $R_6$ represents hydrogen or an alkyl group having one or more and two or less carbon atoms.

Examples of the lactone solvent include γ-butyrolactone, γ-valerolactone, γ-hexanolactone, γ-heptanolactone, δ-valerolactone, δ-hexanolactone, δ-heptalactone, δ-octalactone, δ-nonalactone, δ-decalactone, δ-undecalactone, and ε-caprolactone.

In particular, the lactone solvent is preferably a six- or more-membered ring lactone solvent. Examples of the six- or more-membered ring lactone solvent include δ-valerolactone, δ-hexanolactone, and ε-caprolactone.

The nonaqueous ink composition containing, as the organic solvent (a), at least one selected from the group consisting of the alkylamide solvent (a1), the cyclic amide solvent (a2), and the lactone solvent (a3) produces advantageous effects according to the present invention. In particular, to make the present invention particularly advantageous, the nonaqueous ink composition preferably contains, as the organic solvent (a), at least one of the alkylamide solvent (a1) and the cyclic amide solvent (a2), and more preferably contains the alkylamide solvent (a1) as the organic solvent (a).

The upper limit of the content of the organic solvent (a) in the nonaqueous ink composition is preferably, but not limited to, 30.0 mass % or less, more preferably 20.0 mass % or less, even more preferably 15.0 mass % or less, based on the total mass of the nonaqueous ink composition.

The lower limit of the content of the organic solvent (a) in the nonaqueous ink composition is preferably, but not limited to, 3.0 mass % or more, more preferably 5.0 mass % or more, even more preferably more than 5.0 mass %, based on the total mass of the nonaqueous ink composition.

The upper and lower limits of the content of the organic solvent (a) apply to all of the alkylamide solvent (a1), the cyclic amide solvent (a2), and the lactone solvent (a3).

It is preferred that before the mixing of the organic solvent (a) (at least one selected from the group consisting of the alkylamide solvent (a1), the cyclic amide solvent (a2), and the lactone solvent (a3)) with other components, the impurity content of the organic solvent (a) be preliminarily reduced to 0.5 mass % or less based on the total mass of the organic solvent (a). Low-boiling-point impurities in the organic solvent (a) may cause troubles, such as dissolution or swelling of the cured adhesive material. The preliminary reduction of the impurity content of the organic solvent (a) to 0.5 mass % or less before the mixing of the organic solvent (a) with other components will make the nonaqueous ink composition particularly advantageous according to the present invention. The preliminary reduction of the impurity content of the organic solvent (a) to 0.5 mass % or less also helps to prevent print blurring more effectively, which would otherwise be caused by high-boiling-point impurities in the organic solvent (a) which are capable of reducing the ability to dry during recording.

The purification of the organic solvent (a) may be achieved by a method that includes repeatedly distilling the organic solvent (a) with narrow distillation temperature intervals to exclude impurities as much as possible or repeatedly performing extraction on the organic solvent (a) or by an industrial production process that includes the above steps and a procedure for preventing contamination.

Additional Organic Solvent

The nonaqueous ink composition may contain an additional organic solvent in addition to the organic solvent (a) described above. Specifically, such an additional organic solvent may be a dialkyl glycol ether, which is a glycol derivative with alkyl-substituted OH groups at both ends, a monoalkyl glycol ether, which is a glycol derivative with one alkyl-substituted OH group, or a carbonate ester.

The dialkyl glycol ether may be, for example, a dialkyl glycol ether represented by formula (7) below.

[Chem. 10]

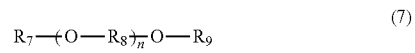

(7)

In formula (7), $R_7$ and $R_9$ each represent an alkyl group, $R_8$ represents an ethylene or propylene group, and n represents an integer of 2 to 4.

Examples of the dialkyl glycol ether includes ethylene glycol dibutyl ether, ethylene glycol dipropyl ether, diethylene glycol dimethyl ether, diethylene glycol diethyl ether, diethylene glycol methyl ethyl ether, diethylene glycol dipropyl ether, diethylene glycol propyl methyl ether, diethylene glycol isopropyl methyl ether, diethylene glycol dibutyl ether, diethylene glycol butyl methyl ether, diethylene glycol butyl ethyl ether, diethylene glycol methyl-2-ethyl hexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethyl hexyl ether, dipropylene glycol dimethyl ether, dipropylene glycol diethyl ether, dipropylene glycol ethyl methyl ether, dipropylene glycol methyl propyl ether, dipropylene glycol dipropyl ether, dipropylene glycol methyl butyl ether, tripropylene glycol dimethyl ether, tripropylene glycol diethyl ether, and tripropylene glycol ethyl methyl ether.

In the dialkyl glycol ether of formula (7), the total number of carbon atoms in $R_7$ and $R_9$ is preferably two or more and eight or less, more preferably two or more and six or less. In the dialkyl glycol ether of formula (7), $R_7$ is more preferably a methyl or ethyl group, and $R_9$ is more preferably an ethyl group, and/or $R_7$ and $R_9$ are more preferably methyl groups, and $R_8$ is more preferably a propylene group.

The dialkyl glycol ether with $R_7$ and $R_9$ having two or more and six or less carbon atoms in total is more volatile than, for example, diethylene glycol dibutyl ether (with $R_7$ and $R_9$ having eight carbon atoms in total) and thus forms a nonaqueous ink composition with a higher ability to dry during recording.

Examples of the dialkyl glycol ether with $R_7$ and $R_9$ having two or more and six or less carbon atoms in total include diethylene glycol methyl ethyl ether, diethylene glycol diethyl ether, diethylene glycol dimethyl ether, dipropylene glycol dimethyl ether, diethylene glycol isopropyl methyl ether, triethylene glycol dimethyl ether, tetraethylene glycol dimethyl ether, and tetraethylene glycol diethyl ether.

The use of the dialkyl glycol ether of formula (7) with $R_7$ being a methyl or ethyl group and $R_9$ being an ethyl group or the use of the dialkyl glycol ether of formula (7) with $R_7$ and $R_9$ being methyl groups and $R_8$ being a propylene group is more effective in preventing the erosion of the cured adhesive material than, for example, the use of diethylene glycol dimethyl ether (with $R_7$ and $R_9$ being methyl groups and $R_8$ being an ethylene group).

Examples of the dialkyl glycol ether of formula (7) with $R_7$ being a methyl or ethyl group and $R_9$ being an ethyl group include diethylene glycol methyl ethyl ether, diethylene glycol diethyl ether, triethylene glycol diethyl ether, and tetraethylene glycol diethyl ether. Examples of the dialkyl glycol ether of formula (7) with $R_7$ and $R_9$ being methyl groups and $R_8$ being a propylene group include dipropylene glycol dimethyl ether.

During the production of the dialkyl glycol ether, impurities are often generated, such as polymers, side reaction products, and decomposition products. For example, the content of impurities in a certain commercially available dialkyl glycol ether may be as high as about 10 mass % based on its total mass. It is preferred, therefore, that before the mixing of the dialkyl glycol ether with other components, the impurity content of the dialkyl glycol ether be preliminarily reduced to 0.5 mass % or less based on the total mass of the dialkyl glycol ether. Low-boiling-point impurities in the dialkyl glycol ether may give a bad odor. Low-boiling-point impurities in the dialkyl glycol ether may also cause troubles, such as dissolution or swelling of plastic materials or adhesives in printer components, such as inkjet heads. Moreover, high-boiling-point impurities in the dialkyl glycol ether may reduce the ability of the nonaqueous ink composition to dry during recording and thus may cause print blurring. The preliminary reduction of the impurity content of the dialkyl glycol ether solvent to 0.5 mass % or less before the mixing of the dialkyl glycol ether with other components will provide a solution to these problems and make the nonaqueous ink composition more advantageous according to the present invention.

Examples of impurities in the dialkyl glycol ether include, but are not limited to, triethylene glycol (boiling point 285° C.), tetraethylene glycol (boiling point 327° C.), polyethylene glycol (boiling point 330° C. or higher), ethylene glycol monoethyl ether (boiling point 135° C.), ethylene glycol monomethyl ether (boiling point 124° C.), ethylene glycol diethyl ether (boiling point 121° C.), ethylene glycol dimethyl ether (boiling point 98° C.), diethyl ether (boiling point 35° C.), ethyl methyl ether (boiling point 12° C.), diethyl ketone (boiling point 101° C.), dimethyl ketone (boiling point 57° C.), ethyl methyl ketone (boiling point 80° C.), ethoxyethanol (boiling point 135° C.), and ethanol (boiling point 78° C.).

The purification of the dialkyl glycol ether may be achieved by a method that includes repeatedly distilling the dialkyl glycol ether with narrow distillation temperature intervals to exclude impurities as much as possible or by repeatedly performing extraction on the dialkyl glycol ether or by an industrial production process that includes the above steps and a procedure for preventing contamination.

The lower limit of the content of the dialkyl glycol ether, if any, in the nonaqueous ink composition is preferably, but not limited to, 30.0 mass % or more, more preferably 40.0 mass % or more, even more preferably 50.0 mass % or more, based on the total mass of the nonaqueous ink composition.

The upper limit of the content of the dialkyl glycol ether in the nonaqueous ink composition is preferably, but not limited to, 90.0 mass % or less, more preferably 80.0 mass % or less.

Examples of the monoalkyl glycol ether include ethylene glycol mono-n-butyl ether, ethylene glycol mono-isobutyl ether, ethylene glycol mono-tert-butyl ether, ethylene glycol mono-2-ethylhexyl ether, diethylene glycol mono-methyl (or -ethyl, -propyl, -isopropyl, -n-butyl, -isobutyl, -tert-butyl, or -2-ethylhexyl) ether, triethylene glycol mono-methyl (or -ethyl, -propyl, -isopropyl, -n-butyl, -isobutyl, -tert-butyl, or -2-ethylhexyl) ether, tetraethylene glycol mono-methyl (or -ethyl, -propyl, -isopropyl, -n-butyl, -isobutyl, -tert-butyl, or -2-ethylhexyl) ether, propylene glycol mono-n-butyl ether, propylene glycol mono-isobutyl ether, propylene glycol mono-tert-butyl ether, propylene glycol mono-2-ethylhexyl ether, dipropylene glycol mono-methyl (or -ethyl, -propyl, -isopropyl, -n-butyl, -isobutyl, -tert-butyl, or -2-ethylhexyl) ether, tripropylene glycol mono-methyl (or -ethyl, -propyl, -isopropyl, -n-butyl, -isobutyl, or -tert-butyl) ether, and tetrapropylene glycol mono-methyl (or -ethyl, -propyl, -isopropyl, -n-butyl, -isobutyl, -tert-butyl, or -2-ethylhexyl) ether.

Examples of the carbonate ester include ethylene carbonate and propylene carbonate.

The nonaqueous ink composition may also contain organic solvents other than the above organic solvents. Examples of such other organic solvents include oxazolidinone solvents, such as 3-methyl-2-oxazolidinone, 3-ethyl-2-oxazolidinone, and N-vinylmethyloxazolidinone; acetate solvents, such as triethylene glycol butyl ether acetate, ethylene glycol butyl ether acetate, diethylene glycol ethyl ether acetate, diethylene glycol methyl ether acetate, diethylene glycol butyl ether acetate, propylene glycol methyl ether acetate, dipropylene glycol methyl ether acetate, 1-methoxy-2-propyl acetate, 2-methylbutyl acetate, 3-methoxybutyl ether acetate, and cyclohexyl acetate; amide solvents other than the alkylamide solvent (b1) and the cyclic amide solvent (b2), such as 3-methoxypropanamide, 3-butoxypropanamide, N,N-dimethyl-3-methoxypropanamide, N,N-dibutyl-3-methoxypropanamide, N,N-dibutyl-3-butoxypropanamide, and N,N-dimethyl-3-butoxypropanamide; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monovalent alcohol solvents, such as 3-methoxy-3-methyl-1-butanol, 3-methoxy-1-propanol, 1-methoxy-2-propanol, and 3-methoxy-n-butanol; ketones or ketoalcohols, such as acetone, diacetone alcohol, methyl ethyl ketone, methyl n-propyl ketone, methyl isopropyl ketone, methyl n-butyl ketone, methyl isobutyl ketone, methyl n-amyl ketone, methyl hexyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclopentanone, cyclohexanone, methyl cyclohexanone, isophorone, and acetyl ketone; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetravalent alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; acetic acid esters, such as methyl acetate, ethyl acetate, n-propyl acetate, isopropyl acetate, n-butyl acetate, isobutyl acetate, hexyl acetate, and octyl acetate; lactic acid esters, such as methyl lactate, ethyl lactate, butyl lactate, propyl lactate, ethylhexyl lactate, amyl lactate, and isoamyl lactate; saturated hydrocarbons, such as n-hexane, isohexane, n-nonane, isononane, dodecane, and isododecane; unsaturated hydrocarbons, such as 1-hexene, 1-heptene, and 1-octene; cyclic unsaturated hydrocarbons, such as cyclohexene, cycloheptene, cyclooctene, 1,1,3,5,7-cyclooctatetraene, and cyclododecene; aromatic hydrocarbons, such as benzene, toluene, and xylene; morpholines, such as N-methylmorpholine, N-ethylmorpholine, and N-formylmorpholine; terpene solvents; and dibasic acid esters, such as dimethyl oxalate, diethyl oxalate, dimethyl malonate, diethyl malonate, dipropyl malonate, dimethyl succinate, diethyl succinate, dimethyl glutarate, and diethyl glutarate. It is preferred to select solvents with suitable HLB values depending on the resin or the dispersant to be used in combination with them.

Colorant

The nonaqueous ink composition according to this embodiment includes a colorant. The colorant may be any type and may be a dye or a pigment. Preferably, the colorant is a pigment (pigment colorant) for the purpose of providing recorded products having high resistance to water, light, and so on. The nonaqueous ink composition according to this embodiment may include any pigment, such as an organic or inorganic pigment used for conventional ink compositions. The nonaqueous ink composition may include a single pigment or a combination of two or more pigments.

Examples of the organic pigment include insoluble azo pigments, soluble azo pigments, pigments derived from dyes, phthalocyanine organic pigments, quinacridone organic pigments, perylene organic pigments, perinone organic pigments, azomethine organic pigments, anthraquinone organic pigments (anthrone organic pigments), xanthene organic pigments, diketopyrrolopyrrole organic pigments, dioxazine organic pigments, nickel azo pigments, isoindolinone organic pigments, pyranthrone organic pigments, thioindigo organic pigments, condensed azo organic pigments, benzimidazolone organic pigments, quinophthalone organic pigments, isoindoline organic pigments, organic solid solution pigments, such as quinacridone solid solution pigments and perylene solid solution pigments, and other pigments such as lake pigments and carbon black.

Examples of the organic pigment, represented by color index (C.I.) numbers, include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214, C.I. Pigment Red 5, 7, 9, 12, 48, 49, 52, 53, 57:1, 97, 112, 122, 123, 146, 149, 150, 168, 177, 180, 184, 192, 202, 206, 208, 209, 215, 216, 217, 220, 223, 224, 226, 227, 228, 238, 240, 254, 255, 269, and 291, C.I. Pigment Orange 16, 36, 43, 51, 55, 59, 61, 64, 71, and 73, C.I. Pigment Violet 19, 23, 29, 30, 37, 40, and 50, C.I. Pigment Blue 15, 15:1, 15:3, 15:4, 15:6, 16, 22, 60, and 64, C.I. Pigment Green 7, 36, 58, 59, 62, and 63, C.I. Pigment Brown 23, 25, and 26, and C.I. Pigment Black 7.

Examples of the dye that may be used for the nonaqueous ink composition according to this embodiment include azo dyes, benzoquinone dyes, naphthoquinone dyes, anthraquinone dyes, cyanine dyes, squarylium dyes, croconium dyes, merocyanine dyes, stilbene dyes, diarylmethane dyes, triarylmethane dyes, fluoran dyes, spiropyran dyes, phthalocyanine dyes, indigo dyes such as indigoid, fulgide dyes, nickel complex dyes, and azulene dyes.

Examples of the inorganic pigment that may be used for the nonaqueous ink composition according to this embodiment include titanium dioxide, barium sulfate, calcium carbonate, zinc oxide, barium carbonate, silica, talc, clay, synthetic mica, alumina, zinc oxide, lead sulfate, lead yellow, zinc yellow, rouge (red iron(III) oxide), cadmium red, ultramarine, ferric hexacyanoferrate, chromium oxide green, cobalt green, amber, titanium black, aluminum, titanium, indium, synthetic iron black, and inorganic solid solution pigments.

The nonaqueous ink composition according to this embodiment may contain a pigment in the form of particles with any average dispersion diameter that allows the desired color to be produced. To have good dispersibility, good dispersion stability, and sufficient coloring power, the pigment is preferably in the form of particles with a volume average particle diameter in the range of 5 nm or more, more preferably in the range of 20 nm or more, even more preferably in the range of 30 nm or more, while the volume average particle diameter depends on the type of the pigment used. When the volume average particle diameter is at least the lower limit shown above, the nonaqueous ink composition will have higher light fastness. The volume average particle diameter is preferably in the range of 300 nm or less, more preferably in the range of 200 nm or less, even more preferably in the range of 150 nm or less. When the volume average particle diameter is at most the upper limit shown above, the inkjet ejection will have higher stability. In this embodiment, the volume average particle diameter of the pigment is the volume average particle diameter (D50) measured under 25° C. conditions using a particle size distribution measurement system (Nanotrac Wave (a particle size analyzer manufactured by MicrotracBEL Corporation)).

An ink set may be provided including nonaqueous ink compositions according to this embodiment. In this case, the pigments in the nonaqueous ink compositions may have the same volume average particle diameter or different volume average particle diameters.

The content of the pigment in the nonaqueous ink composition according to this embodiment may be any level that allows the formation of desired images and may be adjusted as appropriate. Specifically, the content of the pigment in the nonaqueous ink composition is preferably 0.05 mass % or more, more preferably 0.1 mass % or more, based on the total mass of the nonaqueous ink composition, while it depends on the type of the pigment. The content of the pigment in the nonaqueous ink composition is preferably 20 mass % or less, more preferably 10 mass % or less, based on the total mass of the nonaqueous ink composition. The pigment at a content in the range of 0.05 mass % or more and 20 mass % or less will have a good balance between dispersion stability and coloring power.

The nonaqueous ink composition according to this embodiment may be used to record (print) in any color, and a colorant or a combination of colorants may be selected and used depending on the desired color or colors. Any color ink may be used, such as yellow, magenta, cyan, or black ink, and any other type of ink may also be used, such as light magenta, light cyan, light black, orange, green, red, or white ink.

Resin

The nonaqueous ink composition according to this embodiment may contain a resin for forming a decorated layer with higher fixability, higher water resistance, and higher stretchability. Examples of the resin that may be used include acrylic resins, polystyrene resins, polyester resins, vinyl chloride resins, vinyl acetate resins, vinyl chloride-vinyl acetate copolymer resins, polyethylene resins, polyurethane resins, rosin-modified resins, phenolic resins, terpene resins, polyamide resins, vinyl toluene-α-methylstyrene copolymers, ethylene-vinyl acetate copolymers, cellulosic resins, silicone (silicon) resins, acrylamide resins, epoxy resins, resins produced by copolymerization of any of these resins, and any mixture of these resins. Among them, the nonaqueous ink composition preferably contains an acrylic resin, a vinyl chloride-vinyl acetate copolymer resin, a cellulosic resin, a polyester resin, or a polyurethane resin. In particular, the nonaqueous ink composition preferably contains at least one of an acrylic resin and a vinyl chloride-vinyl acetate copolymer resin so that it can provide higher levels of water resistance, solvent resistance, and stretchability. When used as a inkjet ink composition, the nonaqueous ink composition containing at least one of an acrylic resin and a vinyl chloride-vinyl acetate copolymer resin can be ejected with higher levels of responsiveness and stability during high-speed recording.

The acrylic resin may be any (meth)acrylate ester monomer-based polymer resin. The acrylic resin may be a homopolymer of a single radically-polymerizable monomer or a copolymer of two or more selected radically-polymerizable monomers. In particular, the acrylic resin for use in the nonaqueous ink composition according to this embodiment is preferably a homopolymer of methyl methacrylate or a copolymer of methyl methacrylate and at least one compound selected from the group consisting of butyl methacrylate, ethoxyethyl methacrylate, and benzyl methacrylate. Commercially available (meth)acrylic resins may also be used, such as Paraloid B99N, Paraloid B60, Paraloid B66, and Paraloid B82 available from Rohm and Haas Company.

The vinyl chloride resin may be either a homopolymer of a vinyl chloride monomer or a copolymer of two or more selected polymerizable monomers. The vinyl chloride copolymer resin may be, for example, a vinyl chloride-vinyl acetate copolymer resin. The vinyl chloride-vinyl acetate copolymer resin may be a polymer of a vinyl chloride monomer and a vinyl acetate monomer. Examples of the vinyl chloride-vinyl acetate copolymer resin include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-hydroxyalkyl acrylate copolymers, and any mixture thereof. The vinyl chloride-vinyl acetate copolymer resin is available from Nissin Chemical Co., Ltd. under trade names such as SOLBIN C, SOLBIN CL, SOLBIN CNL, SOLBIN CLL, SOLBIN CLL2, SOLBIN C5R, SOLBIN TA2, SOLBIN TA3, SOLBIN A, SOLBIN AL, SOLBIN TA5R, and SOLBIN M5.

The vinyl chloride-vinyl acetate copolymer resin may be obtained by polymerization of a vinyl chloride monomer and a vinyl acetate monomer. The polymerization method may be any conventionally known method. The polymerization method is preferably an emulsion or suspension polymerization method, more preferably a suspension polymerization method.

The cellulosic resin is a resin that has a cellulose skeleton and is obtained by biologically or chemically introducing functional groups into cellulose used as a raw material. Examples of the cellulosic resin include cellulose acetate alkylate resins, such as cellulose acetate butyrate resins, cellulose acetate propionate resins, and cellulose acetate propionate butyrate resins, cellulose acetate resins, nitrocellulose resins, and any mixture thereof. The cellulosic resin is available from Eastman Chemical Company under trade names such as CAB-551-0.01, CAB-551-0.2, CAB-553-0.4, CAB-531-1, CAB-381-0.1, CAB-381-0.5, CAB-381-2, CAB-381-20, CAP-504, and CAP-482-0.5.

The polyester resin includes at least a structural unit formed by polycondensation of an alcohol component with a carboxylic acid component. The polyester resin may include a modified polyester resin. The polyester resin is available from Toyobo Co., Ltd. under trade names such as VYLON 226, VYLON 270, VYLON 560, VYLON 600, VYLON 630, VYLON 660, VYLON 885, VYLON GK250, VYLON GK810, and VYLON GK890, and available from Unitika Ltd. under trade names such as elitleUE-3200, elitleUE-3285, elitleUE-3320, elitleUE-9800, and elitleUE-9885.

The polyurethane resin includes at least a structural unit formed by copolymerization of an alcohol component and an isocyanate component. The polyurethane resin may include a polyester-, polyether-, or caprolactone-modified polyurethane resin. The polyurethane resin is available from Arakawa Chemical Industries, Ltd. under trade names such as UREARNO KL-424, UREARNO KL-564, UREARNO KL-593, and UREARNO 3262, and available from DIC Corporation under trade names such as PANDEX 372E, PANDEX 390E, PANDEX 394E, PANDEX 304, PANDEX 305E, PANDEX P-870, PANDEX P-910, PANDEX P-895, PANDEX 4030, and PANDEX 4110.

The acrylic resin, the vinyl chloride-vinyl acetate copolymer resin, the cellulosic resin, the polyester resin, and the polyurethane resin may be used alone. Preferably, a mixture of two or more of the acrylic resin, the vinyl chloride-vinyl acetate copolymer resin, the cellulosic resin, the polyester resin, and the polyurethane resin is used, and more preferably, a mixture of the acrylic resin and the vinyl chloride-vinyl acetate copolymer resin is used. The ratio between the contents of the acrylic resin and the vinyl chloride-vinyl acetate copolymer resin may be controlled such that the nonaqueous ink composition will satisfy the requirements for coloring, drying ability, coating physical properties, printability, and other properties. The mixing ratio between the acrylic resin and the vinyl chloride-vinyl acetate copolymer resin may be changed to any value as needed.

The weight average molecular weight (relative molecular mass) of the resin is preferably, but not limited to, 5,000 or more, more preferably 15,000 or more. The weight average molecular weight (relative molecular mass) of the resin is preferably 100,000 or less, more preferably 50,000 or less. The relative molecular mass of the resin may be measured by common gel permeation chromatography (GPC).

For example, the content (mass %) of the resin in the nonaqueous ink composition according to this embodiment is preferably, but not limited to, 0.05 mass % or more, more preferably 0.1 mass % or more, even more preferably 0.5 mass % or more, furthermore preferably 1 mass % or more, based on the total mass of the nonaqueous ink composition.

The content (mass %) of the resin in the nonaqueous ink composition is preferably, but not limited to, 20 mass % or less, more preferably 15 mass % or less, based on the total mass of the nonaqueous ink composition.

Dispersant

If necessary, the nonaqueous ink composition according to this embodiment may contain a dispersant. The dispersant may be any type used for nonaqueous ink compositions. The dispersant is preferably a polymer dispersant. Such a dispersant includes a polyester, polyacrylic, polyurethane, polyamine, or polycaprolactone main chain; and a polar group side chain, such as an amino, carboxyl, sulfone, or hydroxyl group. Examples of the polyacrylic dispersant that may be used include Disperbyk-2000, 2001, 2008, 2009, 2010, 2020, 2020N, 2022, 2025, 2050, 2070, 2095, 2150, 2151, 2155, 2163, and 2164, and BYKJET-9130, 9131, 9132, 9133, and 9151 (manufactured by BYK-Chemie); Efka PX 4310, PX 4320, PX 4330, PA 4401, 4402, PA 4403, 4570, 7411, 7477, PX 4700, and PX 4701 (manufactured by BASF), TREPLUS D-1200, D-1410, D-1420, and MD-1000 (manufactured by Otsuka Chemical Co., Ltd.), and FLOWLEN DOPA-15BHFS, 17HF, 22, G-700, 900, NC-500, and GW-1500 (manufactured by Kyoeisha Chemical Co., Ltd.). Examples of the polycaprolactone dispersant include AJISPUR PB821, PB822, and PB881 (manufactured by Ajinomoto Fine-Techno Co., Inc.), Hinoact KF-1000, T-6000, T-7000, T-8000, T-8000E, and T-9050 (manufactured by Kawaken Fine Chemicals Co., Ltd.), Solsperse 20000, 24000, 32000, 32500, 32550, 32600, 33000, 33500, 34000, 35200, 36000, 37500, 39000, 71000, 76400, 76500, 86000, 88000, J180, and J200 (manufactured by The Lubrizol Corporation), and TEGO Dispers 652, 655, 685, 688, and 690 (manufactured by Evonik Japan Co., Ltd.). Preferred examples of the dispersant include BYKJET-9130, 9131, 9132, 9133, and 9151, Efka PX 4310, PX 4320, PX 4330, PX 4700, and PX 4701, Solsperse 20000, 24000, 32000, 33000, 33500, 34000, 35200, 39000, 71000, 76500, 86000, 88000, J180, and J200, and TEGO Dispers 655, 685, 688, and 690. These dispersants may be used alone, or any mixture of these dispersants may be used.

In particular, the dispersant is preferably a polycaprolactone dispersant. The dispersant effectively increases the dispersibility of the pigment in the organic solvent (a)-containing, nonaqueous ink composition and effectively prevents the formation of solid precipitates in the nonaqueous ink composition.

The lower limit of the content of the dispersant in the nonaqueous ink composition is preferably, but not limited to, 0.1 mass % or more, more preferably 0.5 mass % or more, even more preferably 0.8 mass % or more, based on the total mass of the nonaqueous ink composition. The upper limit of the content of the dispersant in the nonaqueous ink composition is preferably, but not limited to, 5.0 mass % or less, more preferably 4.0 mass % or less, even more preferably 3.0 mass % or less, based on the total mass of the nonaqueous ink composition. At such a concentration, the dispersant will effectively disperse the pigment in the nonaqueous ink composition and effectively prevent the formation of solid precipitates in the nonaqueous ink composition.

Dispersing Aid

If necessary, the nonaqueous ink composition according to this embodiment may contain a dispersing aid. The dispersing aid adsorbs on the surface of the colorant (pigment) to increase the dispersion stability by means of its functional group with a higher affinity for the organic solvents and the dispersant in the nonaqueous ink composition. Examples of the dispersing aid that may be used include known organic pigment derivatives having a functional group, such as an acidic, basic, or neutral group, on the organic pigment residue.

Surfactant

The nonaqueous ink composition according to this embodiment may contain a surfactant for the purpose of preventing volatilization or solidification of the ink composition in nozzles, tubes, and other device components, redissolving solidified materials, or reducing surface tension to increase the wettability on recording media (substrates). Examples of the surfactant include polyoxyalkylene alkyl ethers, such as NONION P-208, P-210, P-213, E-202S, E-205S, E-215, K-204, K-220, S-207, S-215, A-10R, A-13P, NC-203, and NC-207 (manufactured by NOF Corporation), EMULGEN 106, 108, 707, 709, A-90, and A-60 (manufactured by Kao Corporation), FLOWLEN G-70, D-90, and TG-740W (manufactured by Kyoeisha Chemical Co., Ltd.), POEM J-0081HV (manufactured by Riken Vitamin Co., Ltd.), ADEKA TOL NP-620, NP-650, NP-660, NP-675, NP-683, and NP-686, ADEKA COL CS-141E and TS-230E (manufactured by Adeka Corporation), SORGEN 30V, 40, TW-20, and TW-80, and NOIGEN CX-100 (manufactured by DKS Co., Ltd.), fluorosurfactants preferably including fluorine-modified polymers, such as BYK-340 (manufactured by BYK Chemie Japan K.K.), silicone surfactants preferably including polyester-modified silicones and polyether-modified silicones, such as BYK-313, 315N, 322, 326, 331, 347, and 348, BYK-UV3500, 3510, 3530, and 3570 (all manufactured by BYK Chemie Japan K.K.), and acetylene glycol surfactants, such as SURFYNOL (registered trademark) 82, 104, 465, 485, and TG (all manufactured by Air Products Japan K.K.) and ORFINE (registered trademark) STG and E1010 (all manufactured by Nisshin Chemical Industry Co., Ltd.).

Besides the above, the surfactant may be any of anionic, cationic, amphoteric, or nonionic surfactants, which may be appropriately selected depending on the purpose of the addition.

Other Components

The nonaqueous ink composition according to this embodiment may contain, as optional components, known additives including a stabilizer such as an antioxidant or an ultraviolet absorber, an epoxide, a polyvalent carboxylic acid, a surface modifier, a leveling agent (e.g., an acrylic or silicone leveling agent), an antifoaming agent, a pH adjuster, an antimicrobial agent, a preservative, an odor-control agent, a charge adjuster, and a wetting agent. Examples of the antioxidant include hindered phenol antioxidants, amine antioxidants, phosphorus antioxidants, sulfur antioxidants, and hydrazine antioxidants. Specifically, the antioxidant may be BHA (2,3-butyl-4-oxyanisole) or BHT (2,6-di-tert-butyl-p-cresol). The ultraviolet absorber may be a benzophenone compound or a benzotriazole compound. Examples of the epoxide include epoxy glycerides, epoxy fatty acid monoesters, and epoxy hexahydrophthalates, such as ADK CIZER O-130P and ADK CIZER O-180A (manufactured by Adeka Corporation). Examples of the polyvalent carboxylic acid include citric acid and maleic acid.

Aqueous Ink Composition

An embodiment of the present invention is directed to an aqueous ink composition including: water as a main component; and the organic solvent (a) described above. The aqueous ink composition has a relatively small impact on the environment and is highly safe for operators since it is not flammable. The aqueous ink composition also enables easy printing (recording) on absorbable substrates, such as paper substrates.

The aqueous ink composition according to this embodiment preferably contains deionized water rather than water containing various ions. The content of water in the aqueous ink composition may be at any level where each of the components is dispersible or soluble. The content of water in the aqueous ink composition is preferably in the range of 10 mass % or more and 95 mass % or less, more preferably in the range of 20 mass % or more and 95 mass %, or less, even more preferably in the range of 30 mass % or more and 90 mass % or less, based on the total mass of the aqueous ink composition.

In the aqueous ink composition, the organic solvent (a) (at least one selected from the group consisting of the alkylamide solvent (a1), the cyclic amide solvent (a2), and the lactone solvent (a3)) is preferably that described above for the nonaqueous ink composition. Preferred examples of the alkylamide solvent (a1), the cyclic amide solvent (a2), and the lactone solvent (a3) are the same as those of the organic solvent (a) shown above for the nonaqueous ink composition.

The upper limit of the content of the organic solvent (a) in the aqueous ink composition is preferably, but not limited to, 30.0 mass % or less, more preferably 20.0 mass % or less, even more preferably 15.0 mass % or less, based on the total mass of the aqueous ink composition.

The lower limit of the content of the organic solvent (a) in the aqueous ink composition is preferably, but not limited to, 3.0 mass % or more, more preferably 5.0 mass % or more, based on the total mass of the aqueous ink composition.

The aqueous ink composition may contain an additional organic solvent in addition to the organic solvent (a). Specifically, such an additional organic solvent may be an organic solvent having a boiling point of 150° C. or more and 300° C. or less. In the ink composition, such an organic solvent with a boiling point of 150° C. or more, which does not have high volatility, is less likely to produce an odor, and is also less likely to cause swelling or dissolution of the adhesive, which will lead to prevention of a reduction in the ejection stability of the ink composition. The additional solvent with a boiling point of 300° C. or less is more effective in preventing print blurring caused by a reduction in the ability to dry during recording.

The additional solvent may have a boiling point of 280° C. or more and 300° C. or less. Examples of such a solvent include triethylene glycol (boiling point: 285° C.), glycerol (boiling point: 290° C.), trimethylolethane, and trimethylolpropane. The additional solvent may have a boiling point of 250° C. or more and less than 280° C. Examples of such a solvent include tripropylene glycol (boiling point: 268° C.), 1,6-hexanediol (boiling point: 250° C.), and 3-methyl-1,5-pentanediol (boiling point: 250° C.). The additional solvent may have a boiling point of 200° C. or more and less than 250° C. Examples of such a solvent include dipropylene glycol (boiling point: 232° C.), diethylene glycol (boiling point: 244° C.), dipropylene glycol monomethyl ether acetate (boiling point: 209° C.), diethylene glycol monobutyl ether acetate (boiling point: 247° C.), 1,3-propanediol (boiling point: 214° C.), 1,3-butanediol (boiling point: 208° C.), 1,4-butanediol (boiling point: 230° C.), 1,2-pentanediol (boiling point: 210° C.), 1,2-hexanediol (boiling point: 223° C.), 1,5-pentanediol (boiling point: 242° C.), 1,6-hexanediol (boiling point: 250° C.), 2,2,4-trimethyl-1,3-pentanediol (boiling point: 232° C.), 3-methyl-1,3-butanediol (boiling point: 203° C.), 2-methyl-1,3-pentanediol (boiling point: 214° C.), and 2-ethyl-1,3-hexanediol (boiling point: 244° C.). The additional solvent may have a boiling point of 180° C. or more and less than 200° C. Examples of such a solvent include ethylene glycol (boiling point: 197° C.), propylene glycol (boiling point: 187° C.), 1,2-butanediol (boiling point: 193° C.), and 2-methyl-2,4-pentanediol (boiling point: 198° C.).

The aqueous ink composition according to this embodiment includes a colorant. The colorant may be any type and may be a dye or a pigment. Preferably, the colorant is a pigment (pigment colorant) for the purpose of providing recorded products having high resistance to water, light, and so on. The pigment may be in the form of particles dispersed with a dispersant in a water-soluble solvent or may be in the form of self-dispersed particles with surfaces directly modified with hydrophilic groups. In this embodiment, the inkjet recording ink may contain a combination of organic and inorganic pigments (some examples thereof are shown above) or may contain a combination of a pigment in the form of particles dispersed with a dispersant in a water-soluble solvent and a pigment in the form of self-dispersed particles (described below).

For example, the self-dispersing pigment may be a pigment modified with hydrophilic groups, such as carbonyl, carboxyl, hydroxyl, sulfonic acid, or phosphorus-containing groups. Examples of commercially available self-dispersing pigments include CAB-O-JET 200, CAB-O-JET 250C, CAB-O-JET 260M, CAB-O-JET 270Y, CAB-O-JET 740Y, CAB-O-JET 300, CAB-O-JET 400, CAB-O-JET 450C, CAB-O-JET 465M, CAB-O-JET 470Y, CAB-O-JET 480V, CAB-0-JET 352K, CAB-O-JET 554B, and CAB-O-JET 1027R manufactured by Cabot Corporation; Microjet Blalack 162, Aqua-Black 001, BONJET BLACK CW-1, BONJET BLACK CW-2, and BONJET BLACK CW-3 manufactured by Orient Chemical Industries, Co., Ltd.; Aqua-Black 162 and Aqua-Black 001 manufactured by Tokai Carbon Co., Ltd.; LIOJET WD BLACK 002C manufactured by Toyo Ink Co., Ltd.; SFColor manufactured by Sanyo Color Works, Ltd.; Fuji SP Color manufactured by Fuji Pigment Co., Ltd.; and Hostajet manufactured by Clariant AG.

The aqueous ink composition according to this embodiment may be used to record (print) in any color, and a colorant or a combination of colorants may be selected and used depending on the desired color or colors. Any color ink may be used, such as yellow, magenta, cyan, black light magenta, light cyan, light black, orange, green, red, or white ink.

The aqueous ink composition according to this embodiment may contain a resin for providing improved water resistance to prints (recorded products). In the aqueous ink composition, such a resin preferably at least partially forms a resin emulsion. The term "resin emulsion" means an aqueous dispersion including: a continuous phase of a water-soluble solvent; and dispersed resin fine particles. In the resin emulsion formed in the inkjet recording aqueous ink composition, the resin exists in the form of fine particles, which are dispersed with the aid of electrostatic repulsive force. In general, the resin emulsion has the property of increasing in viscosity and aggregating as the amount of its continuous phase of the water-soluble solvent is reduced by evaporation or permeation, and thus is effective in accelerating the fixation of the colorant onto the recording medium.

The resin in the aqueous ink composition according to this embodiment may be any type exhibiting desired water resistance. Examples of the resin include acrylic resins, polystyrene resins, polyester resins, vinyl chloride resins, vinyl acetate resins, vinyl chloride-vinyl acetate copolymer resins, polyethylene resins, urethane resins, silicone (silicon)

resins, acrylamide resins, epoxy resins, resins produced by copolymerization of any of these resins, and any mixture of these resins. These resins are preferred in terms of improving water resistance and solvent resistance. In particular, the aqueous ink composition preferably contains an acrylic resin, which can provide high levels of ejection stability, water resistance, and solvent resistance.

The acrylic resin may be any (meth)acrylate ester monomer-based polymer resin. The (meth)acrylate ester monomer may be any known compound and is preferably a monofunctional (meth)acrylate ester. Examples of such a (meth)acrylate ester include alkyl (meth)acrylates, aralkyl (meth)acrylates, and alkoxyalkyl (meth)acrylates. Specific examples include methyl (meth)acrylate, ethyl (meth)acrylate, n-propyl (meth)acrylate, iso-propyl (meth)acrylate, n-butyl (meth)acrylate, sec-butyl (meth)acrylate, isobutyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, isooctyl (meth)acrylate, nonyl (meth)acrylate, isononyl (meth)acrylate, dodecyl (meth)acrylate, tridecyl (meth)acrylate, stearyl (meth)acrylate, cyclopentyl (meth)acrylate, cyclohexyl (meth)acrylate, 2-methylcyclohexyl (meth)acrylate, dicyclopentanyl (meth)acrylate, dicyclopentenyl (meth)acrylate, dicyclopentanyloxyethyl (meth)acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate phenyl (meth)acrylate, naphthyl (meth)acrylate, anthracenyl (meth)acrylate, anthraninonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth) acrylate, glycidyl (meth)acrylate, 3,4-epoxycyclohexylmethyl (meth)acrylate, 3,4-epoxycyclohexylethyl (meth)acrylate, 1,1,1-trifluoroethyl (meth)acrylate, perfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino)propyl (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropylmethyldiethoxysilane, 3-methacryloxypropylmethyldimethoxysilane, and other (meth)acrylates.

An acid group-containing monomer, a hydroxyl group-containing monomer, and an amino group-containing monomer may be used to form the acrylic resin. Examples of the acid group-containing monomer include acrylic acid, methacrylic acid, itaconic acid, fumaric acid, maleic acid, crotonic acid, citraconic acid, maleic anhydride, monomethyl maleate, monobutyl maleate, monomethyl itaconate, monobutyl itaconate, vinyl benzoate, monohydroxyethyl oxalate (meth)acrylate, and carboxyl group-containing monomers having an ethylenic unsaturated double bond and a carboxyl group derived from a carboxyl group-containing aliphatic monomer, such as carboxyl-terminated caprolactone-modified (meth)acrylates. The hydroxyl group-containing monomer may be any monomer having an unsaturated double bond and a hydroxyl group. Examples include 2-hydroxyethyl (meth)acrylate, 2-hydroxypropyl (meth)acrylate, 3-hydroxyethyl (meth)acrylate, 3-hydroxypropyl (meth) acrylate, 2-hydroxybutyl (meth)acrylate, 4-hydroxybutyl (meth)acrylate, caprolactone-modified hydroxy(meth)acrylate, methyl α-(hydroxymethyl) (meth)acrylate, ethyl α-(hydroxymethyl) (meth)acrylate, n-butyl α-(hydroxymethyl) (meth)acrylate, 1,4-cyclohexanedimethanol mono(meth) acrylate, and 4-hydroxybutyl (meth)acrylate. The amino group-containing monomer may be any monomer having an unsaturated double bond and an amino group. Examples include (meth)acrylamide, N-monomethyl(meth)acrylamide, N-monoethyl(meth)acrylamide, N,N-dimethyl(meth)acrylamide, N-n-propyl(meth)acrylamide, N-isopropyl (meth)acrylamide, methylenebis(meth)acrylamide, N-methylol(meth)acrylamide, N-butoxymethyl(meth)acrylamide, dimethylaminoethyl(meth)acrylamide, N,N-dimethylaminopropylacrylamide, diacetoneacrylamide, and other acrylamide compounds; dimethylaminoethyl (meth)acrylate, diethylaminoethyl (meth)acrylate, (meth)acrylates of ethylene oxide adduct of morpholine, and other nitrogen atom-containing (meth)acrylate compounds; and N-vinylpyrrolidone, N-vinylpyridine, N-vinylimidazole, N-vinylpyrrole, N-vinyloxazolidone, N-vinylsuccinimide, N-vinylmethylcarbamate, N,N-methylvinylacetamide, (meth)acryloyloxyethyltrimethylammonium chloride, 2-isopropenyl-2-oxazoline, 2-vinyl-2-oxazoline, and (meth) acrylonitrile.

In addition to the (meth)acrylate monomers, if necessary, an additional monomer may be used to form the acrylic resin. Such an additional monomer may be any monomer that is copolymerizable with the (meth)acrylate monomers and has desired levels of water resistance and solvent resistance. Such an additional monomer may be a monofunctional monomer having one ethylenic unsaturated double bond or a polyfunctional monomer having two or more ethylenic unsaturated double bonds. Examples of such an additional monomer that may be used include vinyl monomers, such as vinyl acetate, vinyl chloride, vinylidene chloride, vinyl fluoride, vinylidene fluoride, N-vinylpyrrolidone, vinylpyridine, N-vinylcarbazole, vinylimidazole, vinyl ether, vinyl ketone, and vinylpyrrolidone; aromatic vinyl monomers, such as styrene, α-, o-, m-, or p-alkyl, nitro, cyano, amide, or ester derivatives of styrene, vinyl toluene, and chlorostyrene; olefin monomers, such as ethylene, propylene, and isopropylene; diene monomers, such as butadiene and chloroprene; and vinyl cyanide monomers, such as acrylonitrile and methacrylonitrile. Examples of such an additional monomer that may be used also include diacrylate compounds, such as polyethylene glycol diacrylate, triethylene glycol diacrylate, and 1,3-butylene glycol diacrylate; triacrylate compounds, such as trimethylolpropane triacrylate, trimethylolethane triacrylate, and tetramethylolmethane triacrylate; dimethacrylate compounds, such as ethylene glycol dimethacrylate, diethylene glycol dimethacrylate, and triethylene glycol dimethacrylate; trimethacrylate compounds, such as trimethylolpropane trimethacrylate and trimethylolethane trimethacrylate; and divinylbenzene. The acrylic resin may be any polymer capable of being made from any of these monomers. The monomers may be copolymerized into any copolymer form, such as a block copolymer, a random copolymer, or a graft copolymer. The resin emulsion may be produced by, for example, a process that includes performing emulsion polymerization reaction and then neutralizing the reaction product. The emulsifier may be a common polymer surfactant or an unsaturated bond-containing reactive surfactant. The method for synthesizing the resin emulsion typically includes, but is not limited to, subjecting a mixture of water, monomers, an emulsifier, and a polymerization initiator to emulsion polymerization in the presence of a reactive surfactant, a non-reactive surfactant, polyvinyl alcohol, a cellulose derivative, or the like. Alternatively, the resin emulsion may be obtained by mixing resin fine particles and a surfactant with water without performing emulsion polymerization reaction. For example, the resin emulsion may be obtained by a process including: adding a surfactant and fine particles of a (meth)acrylate resin or a styrene-(meth)acrylate resin into water; and mixing them.

Examples of commercially available resin emulsions include, but are not limited to, ACRIT WEM-031U, WEM-200U, WEM-321, WEM-3000, WEM-202U, and WEM-3008 (acrylic-urethane resin emulsions manufactured by Taisei Fine Chemical Co., Ltd.); ACRIT UW-550CS, UW-223SX, AKW-107, and RKW-500 (acrylic resin emulsions manufactured by Taisei Fine Chemical Co., Ltd.); LUBRIJET N240 (acrylic resin emulsion manufactured by The Lubrizol Corporation); SUPERFLEX 150, 210, 470, 500M, 620, 650, E2000, E4800, and R5002 (urethane resin emulsions manufactured by DKS Co., Ltd.); VINYBLAN 701 FE35, 701 FE50, 701 FE65, 700, 701, 711, 737, and 747 (vinyl chloride-acrylic resin emulsions manufactured by Nissin Chemical Industry Co., Ltd.); VINYBLAN 2706 and 2685 (acrylic resin emulsions manufactured by Nissin Chemical Industry Co., Ltd.); and MOVINYL 743N, 6600, 7470, and 7720 (acrylic resin emulsions manufactured by The Nippon Synthetic Chemical Industry Co., Ltd.).

The volume average particle diameter of the resin emulsion is preferably 30 nm or more and 300 nm or less, more preferably 50 nm or more and 250 nm or less in view of inkjet ejection stability and its dispersion stability in the ink composition. In this embodiment, the volume average particle diameter of the resin emulsion is the volume average particle diameter (D50) measured under 25° C. conditions using a particle size distribution measurement system (Nanotrac Wave (a particle size analyzer manufactured by MicrotracBEL Corporation)).

The aqueous ink composition according to this embodiment may contain a surfactant as an additional additive. Examples of the surfactant that may be used for the aqueous ink composition according to this embodiment include, but are not limited to, polysiloxane compounds, anionic surfactants, nonionic surfactants, fluorosurfactants, alkylene oxide-modified acetylene glycol surfactants, and non-alkylene-oxide-modified acetylene glycol surfactants. In particular, the aqueous ink composition preferably contains, as a surface-tension modifier, at least one selected from the group consisting of a non-alkylene-oxide-modified acetylene glycol surfactant, an alkylene oxide-modified acetylene glycol surfactant, and a polysiloxane compound so that it can have higher wettability and spreadability on the recording medium.

Examples of the non-alkylene-oxide-modified acetylene glycol surfactant include 2,5-dimethyl-3-hexyne-2,5-diol, 3,6-dimethyl-4-octyne-3,6-diol, 2,4,7,9-tetramethyl-5-decyne-4,7-diol, 3,5-dimethyl-1-hexyne-3-ol, 3-methyl-1-butyne-3-ol, 3-methyl-1-pentyne-3-ol, 3-hexyne-2,5-diol, and 2-butyne-1,4-diol. Commercially available products, such as SURFYNOL 61, 82, and 104 (all manufactured by Air Products) may also be used.

Examples of the alkylene oxide-modified acetylene glycol surfactant include SURFYNOL 420, 440, 465, 485, TG, and 2502, and DYNOL 604 and 607 (all manufactured by Air Products); SURFYNOL SE and MD-20 and OLFINE E1004, E1010, PD-004, EXP4300, PD-501, PD-502, and SPC (all manufactured by Nissin Chemical Industry Co., Ltd.); and ACETYLENOL EH, E40, E60, E81, E100, and E200 (all manufactured by Kawaken Fine Chemicals Co., Ltd.).

Examples of commercially available polysiloxane compounds include FZ-2122, FZ-2110, FZ-7006, FZ-2166, FZ-2164, FZ-7001, FZ-2120, SH8400, FZ-7002, FZ-2104, 8029 ADDITIVE, 57 ADDITIVE, 67 ADDITIVE, 8032 ADDITIVE, and 8616 ADDITIVE (all manufactured by Toray Dow Corning Co., Ltd.); KF-6012, KF-6015, KF-6004, KF-6013, KF-6011, KF-6043, KP-104, 110, 112, 323, and 341, (all manufactured by Shin-Etsu Chemical Co., Ltd.); BYK-300/302, BYK-301, BYK-306, BYK-307, BYK-320, BYK-325, BYK-330, BYK-331, BYK-333, BYK-337, BYK-341, BYK-342, BYK-344, BYK-345/346, BYK-347, BYK-348, BYK-349, BYK-375, BYK-377, BYK-378, BYK-UV3500, BYK-UV3510, BYK-310, BYK-315, BYK-370, BYK-UV3570, BYK-322, BYK-323, BYK-3455, and BYK-Silclean 3700 (all manufactured by BYK-Chemie); SILFACE SAG 503A, SILFACE SJM-002, and SILFACE SJM-003 (all manufactured by Nissin Chemical Industry Co., Ltd.); and TEGO Twin 4000, TEGO Twin 4100, TEGO Wet 240, TEGO Wet 250, and TEGO Wet 240, (all manufactured by Evonik Industries). These additives can be used for both aqueous and nonaqueous ink compositions. In particular, the aqueous ink according to this embodiment preferably contains a polyether group-modified polysiloxane compound, which has polyether groups.

Examples of anionic surfactants, nonionic surfactants, fluorosurfactants, and alkylene oxide-modified acetylene glycol surfactants include EMAL, LATEMUL, NEOPELEX, and DEMOL (all anionic surfactants manufactured by Kao Corporation); SUNNOL, LIPOLAN, LIPON, and LIPAL (all anionic surfactants manufactured by Lion Corporation); NOIGEN, EPAN, and SORGEN (all nonionic surfactants manufactured by DKS Co., Ltd.); EMULGEN, AMIET, and EMASOL (all nonionic surfactants manufactured by Kao Corporation); NAROACTY, EMULMIN, and SANNONIC (all nonionic surfactants manufactured by Sanyo Chemical Industries, Ltd.); MEGAFAC (fluorosurfactant manufactured by DIC Corporation); Surflon (fluorosurfactant manufactured by AGC Seimi Chemical Co., Ltd.); AEROSOL TR-70, TR-70HG, OT-75, OT-N, MA-80, IB-45, EF-800, and A-102 (manufactured by Nippon Cytec Industries); PELEX OT-P, PELEX CS, PELEX TR, and PELEX TA (manufactured by Kao Corporation); Newcol 290-A, Newcol 290-KS, Newcol 291-M, Newcol 291-PG, Newcol 291-GL, Newcol 292-PG, Newcol 293, and Newcol 297 (all anionic surfactants manufactured by Nippon Nyukazai Co., Ltd.); EMULGEN 320P, EMULGEN 350, EMULGEN 430, EMULGEN 130K, and EMULGEN 150 (manufactured by Kao Corporation); NOIGEN TDS-120, NOIGEN TDS-200D, and NOIGEN TDS-500F (manufactured by DKS Co., Ltd.); BLAUNON SR-715, BLAUNON SR-720, BLAUNON SR-730, BLAUNON SR-750, BLAUNON EN-1520A, BLAUNON EN-1530, and BLAUNON EN-1540 (manufactured by Aoki Oil Industrial Co., Ltd.); Newcol 2310, Newcol 2320, Newcol 2327, Newcol 1545, and Newcol 1820 (manufactured by Nippon Nyukazai Co., Ltd.); and NIKKOL BPS20 and NIKKOL BPS30 (all nonionic surfactants manufactured by Nikko Chemicals Co., Ltd.). The content of any of these surfactants may be appropriately adjusted depending on the content of the solvent, the resin, the pigment, and any other surfactant. These surfactants may be used alone, or a combination of two or more of these surfactants may be used. The content of the surfactant is appropriately adjusted according to the miscibility with the ink, the cleaning performance, the wettability on the inner wall of the channel, and the inkjet ejection performance. The surfactant content is preferably 0.05 mass % or more and 5 mass % or less, more preferably 0.5 mass % or more and 3 mass % or less. The aqueous ink composition preferably contains any of these surfactants.

Next, the substrate (recording medium) for use in the recording method according to the embodiment will be described.

Substrate

The nonaqueous ink composition according to the embodiment may be used on any substrate (recording medium). The nonaqueous ink composition may be used on a variety of substrates including absorbable substrates, such as paper and fabrics, non-absorbable substrates, such as resin substrates, metal sheets, and glass, and surface-coated substrates, such as absorbing layer-bearing substrates. The resin may be a polyvinyl chloride polymer, acrylic, polyethylene terephthalate (PET), polycarbonate, polyethylene (PE), or polypropylene (PP). A particularly preferred substrate (recording medium) has a surface made of a hard or soft polyvinyl chloride polymer, since the organic solvent (a) has a relatively high ability to permeate into vinyl chloride polymers. Such a substrate (recoding medium) having a polyvinyl chloride polymer surface is, for example, a polyvinyl chloride substrate (film or sheet).

Method for Producing Recorded Product

The recording method including ejecting the organic solvent (a)-containing, inkjet ink composition onto the surface of the substrate may also be provided as a method for producing a recorded product.

In such a method for producing a recorded product, print blurring is less likely to occur during the ejection of the ink composition onto the surface of the substrate, and the ink composition does not erode the cured adhesive material used to bond components of the inkjet head, which leads to prevention of a reduction in the ejection stability of the ink composition and leads to effective prevention of the failure of ejection of the ink composition onto the desired position on the surface of the substrate.

EXAMPLES

Hereinafter, the present invention will be described in more detail with reference to examples, which are not intended to limit the present invention at all.

1. Preparation of Nonaqueous Ink Compositions

Nonaqueous ink compositions (Examples and Comparative Examples) were prepared each including the organic solvent (a), the additional solvent, the resin, the dispersant, the additive, and the pigment (colorant) in the proportion shown in the tables below. Specifically, the components were dispersed with zirconia beads in a paint shaker to form each nonaqueous ink composition. The values are shown in units of parts by mass. Before the mixing, the concentrations of impurities in the organic solvent (a) and the dialkyl glycol ether were determined by gas chromatography.

(1) Preparation of Acrylic Resin

A mixture of 150 g of methyl methacrylate, 50 g of butyl methacrylate, and a given amount (1.2 g) of tert-butyl peroxy-2-ethylhexanoate (polymerization initiator) was added dropwise over 1.5 hours to 300 g of diethylene glycol diethyl ether kept at 100° C. After the dropwise addition was completed, the mixture was reacted at 100° C. for 2 hours. The reaction mixture was then cooled to give a clear, colorless, methyl methacrylate polymer solution. Subsequently, the solvent was sufficiently removed from the polymer solution by distillation, so that a methyl methacrylate polymer with a weight average molecular weight (polystyrene-equivalent value) of 30,000 was obtained (in the tables, the polymer is expressed as "acrylic resin").

(2) Preparation of Vinyl Chloride-Vinyl Acetate Copolymer Resin

After an autoclave equipped with a stirrer was purged with nitrogen, 100 parts of deionized water, 40 parts of methanol, 32 parts of vinyl chloride, 5 parts of vinyl acetate, 0.2 parts of glycidyl methacrylate, 3.55 parts of hydroxypropyl acrylate, 0.1 parts of hydroxypropyl methyl cellulose (suspension agent), 0.026 parts of di-2-ethylhexyl peroxydicarbonate (polymerization initiator), and 0.57 parts of di-3,5,5-trimethylhexanol peroxide (polymerization initiator) were added into the autoclave. The mixture was heated to 63° C. with stirring under the nitrogen gas atmosphere. Immediately after the temperature reached 63° C., 48 parts of vinyl chloride and a mixture of 0.6 parts of glycidyl methacrylate and 10.65 parts of hydroxypropyl acrylate were continuously added under pressure to the mixture over 6 hours and 5.4 hours, respectively, for copolymerization reaction. At the time point when the pressure in the autoclave reached 0.3 MPa, the residual pressure was released, and after being cooled, the resulting resin slurry was taken out, filtered, and dried to give a vinyl chloride copolymer resin. The resulting vinyl chloride-vinyl acetate copolymer resin had a weight average molecular weight (polystyrene-equivalent value) of 40,000 (in the tables, the resulting resin is expressed as "vinyl chloride-vinyl acetate copolymer").

Evaluation 1

Adequacy for Component

The nonaqueous ink compositions (Examples and Comparative Examples) were evaluated for adequacy for component (adequacy for an inkjet head component). Specifically, an epoxy resin adhesive (two-component curing epoxy adhesive No. 1500 manufactured by Cemedine Co., Ltd.) for use to bond inkjet head components was dried at 60° C. for 1 day to form a cured product, and 0.2 g of the cured product was subjected to an immersion test in which it was immersed in each of the nonaqueous ink compositions (Examples and Comparative Examples) and allowed to stand at 60° C. for 1 week. After the test, it was determined how much the weight of the cured product changed (in the tables, the evaluation result is shown in the "Adequacy for component" column).

Evaluation Criteria

Rating 5: The rate of change in weight is less than 3% with no degradation in the quality of the epoxy adhesive material.

Rating 4: The rate of change in weight is 3% or more and less than 5% with no degradation in the quality of the epoxy adhesive material.

Rating 3: The rate of change in weight is 5% or more and less than 10% with no degradation in the quality of the epoxy adhesive material.

Rating 2: The rate of change in weight is 10% or more and less than 15% with no degradation in the quality of the epoxy adhesive material.

Rating 1: The rate of change in weight is 15% or more and/or there is a degradation in the quality of the epoxy adhesive material.

Evaluation of the Shape of Printed Straight Line

The nonaqueous ink compositions (Examples and Comparative Examples) were evaluated for print quality. Specifically, using an inkjet printer, a 200 μm-thick line extending in the sub-scanning direction of the head was recorded (printed) in high-quality mode (at a printing speed of 10 m²/h) on a recording medium (a polyvinyl chloride film (IMAGin JT5829R manufactured by MACtac)) at a substrate surface temperature of 40° C. by an inkjet method using each of the nonaqueous ink compositions (Examples and Comparative Examples). The resulting recorded product was observed with a loupe (5×), and the width of the observed line was evaluated according to the criteria below (in the tables, the evaluation result is shown in the "straight line shape" column). In the inkjet printer, some components of the inkjet head were bonded together with an epoxy resin adhesive. The inkjet printer used in this evaluation includes: an inkjet head having a member (head cap) that covers the face of the ejection port for ejecting the nonaqueous ink composition; an ink supply unit (ink cartridge); and an ink storage mechanism (damper) provided between the inkjet head and the ink supply unit, in which the adhesive used to bond components includes the epoxy resin adhesive.

Rating 5: The printed line is a straight line having a continuous constant contour and having no dent or bump over a length of 1 cm.

Rating 4: The printed line is a straight line having a continuous constant contour and having 1 to 10 dents or bumps over a length of 1 cm.

Rating 3: The printed line has a continuous constant contour but has more than 11 dents or bumps over a length of 1 cm and its shape is not close to a straight line.

Rating 2: The printed line is not discontinuous but does not have a constant contour.

Rating 1: The printed line has a discontinuous part.

Evaluation of Blurring

An image consisting of: a solid background of a given color; and 6-point letters of a different color on the background was printed in high-quality mode (at a printing speed of 10 m²/h) on a recording medium (an adhesive polyvinyl chloride film (IMAGin JT5829R manufactured by MACtac)) at a substrate surface temperature of 40° C. as in the evaluation of the ability to dry during recording. The resulting recorded product was dried in an oven at 60° C. for 5 minutes, and then it was visually observed whether and how the recorded product blurred.

Evaluation Criteria

Rating 4: No ink blurring is observed, and the 6-point letters are clear.

Rating 3: Slight ink blurring is observed with no esthetic damage.

Rating 2: Ink blurring is observed while the 6-point letters are identifiable.

Rating 1: Significant ink blurring is observed, and the 6-point letters are not visually identifiable.

TABLE 1

|  |  | Example 1 | Example 2 | Example 3 | Example 4 |
|---|---|---|---|---|---|
| Alkylamide solvent (a1) | N,N-Diethylformamide | 30.0 | 20.0 | 15.0 | 5.0 |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 51.0 | 61.0 | 66.0 | 76.0 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black | 3.0 | 3.0 | 3.0 | 3.0 |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.4 | 0.3 | 0.5 | 0.3 |

TABLE 1-continued

|  |  |  |  |  |  |
|---|---|---|---|---|---|
| Content of impurities derived from organic solvent (a) |  | 0.22 | 0.15 | 0.12 | 0.10 |
| Content of impurities derived from dialkyl glycol ether |  | 0.15 | 0.24 | 0.16 | 0.21 |
| Evaluation result | Adequacy for component | 4 | 5 | 5 | 5 |
|  | Straight line shape | 5 | 5 | 5 | 5 |
|  | Blurring | 4 | 4 | 4 | 4 |

|  |  | Example 5 | Example 6 | Example 7 | Example 8 |
|---|---|---|---|---|---|
| Alkylamide solvent (a1) | N,N-Diethylformamide |  |  |  |  |
|  | N,N-Diethylpropanamide | 30.0 | 20.0 | 15.0 | 5.0 |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 51.0 | 61.0 | 66.0 | 76.0 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black | 3.0 | 3.0 | 3.0 | 3.0 |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.2 | 0.3 | 0.4 | 0.3 |
| Content of impurities derived from organic solvent (a) |  | 0.42 | 0.28 | 0.18 | 0.11 |
| Content of impurities derived from dialkyl glycol ether |  | 0.15 | 0.24 | 0.12 | 0.15 |
| Evaluation result | Adequacy for component | 4 | 4 | 5 | 5 |
|  | Straight line shape | 5 | 5 | 5 | 4 |
|  | Blurring | 4 | 4 | 4 | 3 |

|  |  | Example 9 | Example 10 | Example 11 | Example 12 |
|---|---|---|---|---|---|
| Alkylamide solvent (a1) | N,N-Diethylformamide |  |  |  |  |
|  | N,N-Diethylpropanamide |  |  |  |  |
|  | N,N-Diethylacetamide | 15.0 |  |  |  |
| Cyclic amide solvent (a2) | ε-Caprolactam |  |  |  |  |
|  | N-Methylcaprolactam |  | 30.0 | 20.0 | 15.0 |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |

TABLE 1-continued

|  |  | | | | |
|---|---|---|---|---|---|
| Additional solvent | Diethylene glycol methyl ethyl ether | 66.0 | 51.0 | 61.0 | 66.0 |
|  | Diethylene glycol diethyl ether | | | | |
|  | Diethylene glycol dibutyl ether | | | | |
|  | Dipropylene glycol dimethyl ether | | | | |
|  | Triethylene glycol mono-n-butyl ether | | | | |
|  | Tetraethylene glycol monobutyl ether | | | | |
|  | Dipropylene glycol monomethyl ether | 10.0 | 10.0 | 10.0 | 10.0 |
|  | Propylene carbonate | | | | |
|  | Ethylene glycol monobutyl ether acetate | | | | |
|  | 3-Methoxy-N,N-dimethylpropanamide | | | | |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | | | |
| Pigment | Carbon black | 3.0 | 3.0 | 3.0 | 3.0 |
|  | Cyan pigment (P.B.15:4) | | | | |
|  | Magenta pigment (P.R.122) | | | | |
|  | Yellow pigment (P.Y.155) | | | | |
|  | Yellow pigment (P.Y.150) | | | | |
|  | Orange pigment (P.O.43) | | | | |
|  | Orange pigment (P.O.71) | | | | |
|  | Green pigment (P.G.36) | | | | |
|  | Green pigment (P.G.58) | | | | |
|  | Red pigment (P.R.254) | | | | |
|  | White pigment (titanium oxide) | | | | |
|  | Total | 100.0 | 100.0 | 100.0 | 100.0 |
|  | Water content | 0.3 | 0.4 | 0.6 | 0.2 |
|  | Content of impurities derived from organic solvent (a) | 0.25 | 0.26 | 0.20 | 0.15 |
|  | Content of impurities derived from dialkyl glycol ether | 0.16 | 0.16 | 0.13 | 0.13 |
| Evaluation result | Adequacy for component | 5 | 4 | 4 | 4 |
|  | Straight line shape | 5 | 5 | 5 | 4 |
|  | Blurring | 4 | 4 | 4 | 4 |

|  |  | Example 13 | Example 14 | Example 15 | Example 16 |
|---|---|---|---|---|---|
| Alkylamide solvent (a1) | N,N-Diethylformamide | | | | |
|  | N,N-Diethylpropanamide | | | | |
|  | N,N-Diethylacetamide | | | | |
| Cyclic amide solvent (a2) | ε-Caprolactam | | 15.0 | | |
|  | N-Methylcaprolactam | 5.0 | | | |
|  | N-Vinylcaprolactam | | | 15.0 | |
| Lactone solvent (a3) | γ-Butyrolactone | | | | 15.0 |
|  | γ-Valerolactone | | | | |
|  | δ-Valerolactone | | | | |
|  | δ-Hexanolactone | | | | |
|  | ε-Caprolactone | | | | |
| Additional solvent | Diethylene glycol methyl ethyl ether | 76.0 | 66.0 | 66.0 | 66.0 |
|  | Diethylene glycol diethyl ether | | | | |
|  | Diethylene glycol dibutyl ether | | | | |
|  | Dipropylene glycol dimethyl ether | | | | |
|  | Triethylene glycol mono-n-butyl ether | | | | |
|  | Tetraethylene glycol monobutyl ether | | | | |
|  | Dipropylene glycol monomethyl ether | 10.0 | 10.0 | 10.0 | 10.0 |
|  | Propylene carbonate | | | | |
|  | Ethylene glycol monobutyl ether acetate | | | | |
|  | 3-Methoxy-N,N-dimethylpropanamide | | | | |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | | | |

TABLE 1-continued

|  |  |  |  |  |  |
|---|---|---|---|---|---|
| Pigment | Carbon black | 3.0 | 3.0 | 3.0 | 3.0 |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.3 | 0.5 | 0.3 | 0.3 |
|  | Content of impurities derived from organic solvent (a) | 0.09 | 0.17 | 0.42 | 0.20 |
|  | Content of impurities derived from dialkyl glycol ether | 0.15 | 0.16 | 0.18 | 0.13 |
| Evaluation result | Adequacy for component | 5 | 4 | 4 | 2 |
|  | Straight line shape | 4 | 4 | 4 | 4 |
|  | Blurring | 3 | 4 | 4 | 4 |

|  |  | Example 17 | Example 18 | Example 19 | Example 20 |
|---|---|---|---|---|---|
| Alkylamide solvent (a1) | N,N-Diethylformamide |  |  |  |  |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone | 15.0 |  |  |  |
|  | δ-Valerolactone |  | 15.0 |  |  |
|  | δ-Hexanolactone |  |  | 15.0 |  |
|  | ε-Caprolactone |  |  |  | 30.0 |
| Additional solvent | Diethylene glycol methyl ethyl ether | 66.0 | 66.0 | 66.0 | 51.0 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black | 3.0 | 3.0 | 3.0 | 3.0 |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.3 | 0.3 | 0.3 | 0.3 |
|  | Content of impurities derived from organic solvent (a) | 0.20 | 0.20 | 0.25 | 0.19 |
|  | Content of impurities derived from dialkyl glycol ether | 0.13 | 0.15 | 0.13 | 0.16 |
| Evaluation result | Adequacy for component | 2 | 5 | 5 | 3 |
|  | Straight line shape | 4 | 3 | 3 | 4 |
|  | Blurring | 4 | 3 | 3 | 3 |

TABLE 1-continued

| | | Example 21 | Example 22 | Example 23 | Example 24 |
|---|---|---|---|---|---|
| Alkylamide solvent (a1) | N,N-Diethylformamide | | | | 15.0 |
| | N,N-Diethylpropanamide | | | | |
| | N,N-Diethylacetamide | | | | |
| Cyclic amide solvent (a2) | ε-Caprolactam | | | | |
| | N-Methylcaprolactam | | | | |
| | N-Vinylcaprolactam | | | | |
| Lactone solvent (a3) | γ-Butyrolactone | | | | |
| | γ-Valerolactone | | | | |
| | δ-Valerolactone | | | | |
| | δ-Hexanolactone | | | | |
| | ε-Caprolactone | 20.0 | 15.0 | 5.0 | |
| Additional solvent | Diethylene glycol methyl ethyl ether | 61.0 | 66.0 | 76.0 | 70.9 |
| | Diethylene glycol diethyl ether | | | | |
| | Diethylene glycol dibutyl ether | | | | |
| | Dipropylene glycol dimethyl ether | | | | |
| | Triethylene glycol mono-n-butyl ether | | | | |
| | Tetraethylene glycol monobutyl ether | | | | |
| | Dipropylene glycol monomethyl ether | 10.0 | 10.0 | 10.0 | |
| | Propylene carbonate | | | | 5.0 |
| | Ethylene glycol monobutyl ether acetate | | | | |
| | 3-Methoxy-N,N-dimethylpropanamide | | | | |
| Resin | Acrylic resin | 3.0 | 3.0 | 3.0 | 3.0 |
| | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | | | 0.1 |
| Pigment | Carbon black | 3.0 | 3.0 | 3.0 | 3.0 |
| | Cyan pigment (P.B.15:4) | | | | |
| | Magenta pigment (P.R.122) | | | | |
| | Yellow pigment (P.Y.155) | | | | |
| | Yellow pigment (P.Y.150) | | | | |
| | Orange pigment (P.O.43) | | | | |
| | Orange pigment (P.O.71) | | | | |
| | Green pigment (P.G.36) | | | | |
| | Green pigment (P.G.58) | | | | |
| | Red pigment (P.R.254) | | | | |
| | White pigment (titanium oxide) | | | | |
| | Total | 100.0 | 100.0 | 100.0 | 100.0 |
| | Water content | 0.5 | 0.3 | 0.8 | 0.7 |
| | Content of impurities derived from organic solvent (a) | 0.22 | 0.15 | 0.12 | 0.10 |
| | Content of impurities derived from dialkyl glycol ether | 0.13 | 0.15 | 0.16 | 0.13 |
| Evaluation result | Adequacy for component | 4 | 5 | 5 | 5 |
| | Straight line shape | 4 | 3 | 3 | 5 |
| | Blurring | 3 | 3 | 3 | 4 |

| | | Example 25 | Example 26 |
|---|---|---|---|
| Alkylamide solvent (a1) | N,N-Diethylformamide | 15.0 | 15.0 |
| | N,N-Diethylpropanamide | | |
| | N,N-Diethylacetamide | | |
| Cyclic amide solvent (a2) | ε-Caprolactam | | |
| | N-Methylcaprolactam | | |
| | N-Vinylcaprolactam | | |
| Lactone solvent (a3) | γ-Butyrolactone | | |
| | γ-Valerolactone | | |
| | δ-Valerolactone | | |
| | δ-Hexanolactone | | |
| | ε-Caprolactone | | |
| Additional solvent | Diethylene glycol methyl ethyl ether | 65.9 | 65.9 |
| | Diethylene glycol diethyl ether | | |
| | Diethylene glycol dibutyl ether | | |
| | Dipropylene glycol dimethyl ether | | |
| | Triethylene glycol mono-n-butyl ether | | 10.0 |
| | Tetraethylene glycol monobutyl ether | 10.0 | |
| | Dipropylene glycol monomethyl ether | | |
| | Propylene carbonate | | |
| | Ethylene glycol monobutyl ether acetate | | |
| | 3-Methoxy-N,N-dimethylpropanamide | | |
| Resin | Acrylic resin | 3.0 | 3.0 |
| | Vinyl chloride-vinyl acetate copolymer | 1.5 | 1.5 |
| Dispersant | Solsperse32000 | 1.5 | 1.5 |
| Additive | Polyether-modified polydimethylsiloxane | 0.1 | 0.1 |

TABLE 1-continued

| Pigment | Carbon black | 3.0 | 3.0 |
|---|---|---|---|
| | Cyan pigment (P.B.15:4) | | |
| | Magenta pigment (P.R.122) | | |
| | Yellow pigment (P.Y.155) | | |
| | Yellow pigment (P.Y.150) | | |
| | Orange pigment (P.O.43) | | |
| | Orange pigment (P.O.71) | | |
| | Green pigment (P.G.36) | | |
| | Green pigment (P.G.58) | | |
| | Red pigment (P.R.254) | | |
| | White pigment (titanium oxide) | | |
| | Total | 100.0 | 100.0 |
| | Water content | 0.3 | 0.4 |
| | Content of impurities derived from organic solvent (a) | 0.42 | 0.28 |
| | Content of impurities derived from dialkyl glycol ether | 0.13 | 0.15 |
| Evaluation result | Adequacy for component | 5 | 5 |
| | Straight line shape | 5 | 5 |
| | Blurring | 4 | 4 |

TABLE 2

| | | Example 27 | Example 28 | Example 29 | Example 30 |
|---|---|---|---|---|---|
| Alkylamide solvent (a1) | N,N-Diethylformamide | 15.0 | 15.0 | 15.0 | 15.0 |
| | N,N-Diethylpropanamide | | | | |
| | N,N-Diethylacetamide | | | | |
| Cyclic amide solvent (a2) | ε-Caprolactam | | | | |
| | N-Methylcaprolactam | | | | |
| | N-Vinylcaprolactam | | | | |
| Lactone solvent (a3) | γ-Butyrolactone | | | | |
| | γ-Valerolactone | | | | |
| | δ-Valerolactone | | | | |
| | δ-Hexanolactone | | | | |
| | ε-Caprolactone | | | | |
| Additional solvent | Diethylene glycol methyl ethyl ether | | | | 66.0 |
| | Diethylene glycol diethyl ether | 66.0 | | | |
| | Diethylene glycol dibutyl ether | | 66.0 | | |
| | Dipropylene glycol dimethyl ether | | | 66.0 | |
| | Triethylene glycol mono-n-butyl ether | | | | 5.0 |
| | Tetraethylene glycol monobutyl ether | | | | |
| | Dipropylene glycol monomethyl ether | 10.0 | 10.0 | 10.0 | 5.0 |
| | Propylene carbonate | | | | |
| | Ethylene glycol monobutyl ether acetate | | | | |
| | 3-Methoxy-N,N-dimethylpropanamide | | | | |
| Resin | Acrylic resin | 3.0 | 3.0 | 3.0 | 3.0 |
| | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | | | |
| Pigment | Carbon black | 3.0 | 3.0 | 3.0 | 3.0 |
| | Cyan pigment (P.B.15:4) | | | | |
| | Magenta pigment (P.R.122) | | | | |
| | Yellow pigment (P.Y.155) | | | | |
| | Yellow pigment (P.Y.150) | | | | |
| | Orange pigment (P.O.43) | | | | |
| | Orange pigment (P.O.71) | | | | |
| | Green pigment (P.G.36) | | | | |
| | Green pigment (P.G.58) | | | | |
| | Red pigment (P.R.254) | | | | |
| | White pigment (titanium oxide) | | | | |
| | Total | 100.0 | 100.0 | 100.0 | 100.0 |
| | Water content | 0.4 | 0.4 | 0.4 | 0.4 |
| | Content of impurities derived from organic solvent (a) | 0.22 | 0.15 | 0.12 | 0.10 |
| | Content of impurities derived from dialkyl glycol ether | 0.25 | 0.24 | 0.22 | 0.42 |
| Evaluation result | Adequacy for component | 5 | 5 | 5 | 5 |
| | Straight line shape | 5 | 4 | 5 | 5 |
| | Blurring | 4 | 2 | 4 | 4 |
| | | Example 31 | Example 32 | Example 33 | Example 34 |
| Alkylamide solvent (a1) | N,N-Diethylformamide | 15.0 | | | 91.0 |
| | N,N-Diethylpropanamide | | | | |
| | N,N-Diethylacetamide | | | | |

TABLE 2-continued

| | | | | | |
|---|---|---|---|---|---|
| Cyclic amide solvent (a2) | ε-Caprolactam | | | | |
| | N-Methylcaprolactam | | 15.0 | 15.0 | |
| | N-Vinylcaprolactam | | | | |
| Lactone solvent (a3) | γ-Butyrolactone | | | | |
| | γ-Valerolactone | | | | |
| | δ-Valerolactone | | | | |
| | δ-Hexanolactone | | | | |
| | ε-Caprolactone | | | | |
| Additional solvent | Diethylene glycol methyl ethyl ether | 66.0 | 65.9 | 65.9 | |
| | Diethylene glycol diethyl ether | | | | |
| | Diethylene glycol dibutyl ether | | | | |
| | Dipropylene glycol dimethyl ether | | | | |
| | Triethylene glycol mono-n-butyl ether | | | | |
| | Tetraethylene glycol monobutyl ether | | | | |
| | Dipropylene glycol monomethyl ether | 5.0 | 10.0 | 10.0 | |
| | Propylene carbonate | 5.0 | | | |
| | Ethylene glycol monobutyl ether acetate | | | | |
| | 3-Methoxy-N,N-dimethylpropanamide | | | | |
| Resin | Acrylic resin | 3.0 | 3.0 | 3.0 | 3.0 |
| | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | 0.1 | 0.1 | |
| Pigment | Carbon black | 3.0 | 3.0 | 3.0 | 3.0 |
| | Cyan pigment (P.B.15:4) | | | | |
| | Magenta pigment (P.R.122) | | | | |
| | Yellow pigment (P.Y.155) | | | | |
| | Yellow pigment (P.Y.150) | | | | |
| | Orange pigment (P.O.43) | | | | |
| | Orange pigment (P.O.71) | | | | |
| | Green pigment (P.G.36) | | | | |
| | Green pigment (P.G.58) | | | | |
| | Red pigment (P.R.254) | | | | |
| | White pigment (titanium oxide) | | | | |
| | Total | 100.0 | 100.0 | 100.0 | 100.0 |
| | Water content | 0.2 | 1.5 | 0.4 | 0.3 |
| | Content of impurities derived from organic solvent (a) | 0.42 | 0.28 | 0.89 | 0.11 |
| | Content of impurities derived from dialkyl glycol ether | 0.21 | 0.25 | 0.87 | |
| Evaluation result | Adequacy for component | 5 | 4 | 2 | 4 |
| | Straight line shape | 5 | 2 | 4 | 5 |
| | Blurring | 4 | 4 | 2 | 4 |

| | | Example 35 | Example 36 | Example 37 | Example 38 |
|---|---|---|---|---|---|
| Alkylamide solvent (a1) | N,N-Diethylformamide | 81.0 | 61.0 | 50.9 | 15.0 |
| | N,N-Diethylpropanamide | | | | |
| | N,N-Diethylacetamide | | | | |
| Cyclic amide solvent (a2) | ε-Caprolactam | | | | |
| | N-Methylcaprolactam | | | | |
| | N-Vinylcaprolactam | | | | |
| Lactone solvent (a3) | γ-Butyrolactone | | | | |
| | γ-Valerolactone | | | | |
| | δ-Valerolactone | | | | |
| | δ-Hexanolactone | | | | |
| | ε-Caprolactone | | | | |
| Additional solvent | Diethylene glycol methyl ethyl ether | | 20.0 | 30.1 | 66.0 |
| | Diethylene glycol diethyl ether | | | | |
| | Diethylene glycol dibutyl ether | | | | |
| | Dipropylene glycol dimethyl ether | | | | |
| | Triethylene glycol mono-n-butyl ether | | | | |
| | Tetraethylene glycol monobutyl ether | | | | |
| | Dipropylene glycol monomethyl ether | 10.0 | 10.0 | 10.0 | 10.0 |
| | Propylene carbonate | | | | |
| | Ethylene glycol monobutyl ether acetate | | | | |
| | 3-Methoxy-N,N-dimethylpropanamide | | | | |
| Resin | Acrylic resin | 3.0 | 3.0 | 3.0 | 3.0 |
| | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane | | | | |

TABLE 2-continued

|  |  |  |  |  |  |
|---|---|---|---|---|---|
| Pigment | Carbon black | 3.0 | 3.0 | 3.0 |  |
|  | Cyan pigment (P.B.15:4) |  |  |  | 3.0 |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.3 | 0.3 | 0.2 | 0.5 |
| Content of impurities derived from organic solvent (a) |  | 0.25 | 0.26 | 0.15 | 0.09 |
| Content of impurities derived from dialkyl glycol ether |  |  | 0.25 | 0.31 | 0.22 |
| Evaluation result | Adequacy for component | 4 | 4 | 4 | 5 |
|  | Straight line shape | 5 | 5 | 5 | 5 |
|  | Blurring | 4 | 4 | 4 | 4 |

|  |  | Example 39 | Example 40 | Example 41 | Example 42 |
|---|---|---|---|---|---|
| Alkylamide solvent (a1) | N,N-Diethylformamide | 15.0 | 15.0 | 15.0 | 15.0 |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 65.0 | 65.0 | 65.0 | 68.5 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black |  |  |  | 0.5 |
|  | Cyan pigment (P.B.15:4) |  |  |  |  |
|  | Magenta pigment (P.R.122) | 4.0 |  |  |  |
|  | Yellow pigment (P.Y.155) |  | 4.0 |  |  |
|  | Yellow pigment (P.Y.150) |  |  | 4.0 |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.5 | 0.5 | 0.5 | 0.4 |
| Content of impurities derived from organic solvent (a) |  | 0.17 | 0.17 | 0.17 | 0.42 |
| Content of impurities derived from dialkyl glycol ether |  | 0.16 | 0.12 | 0.10 | 0.13 |
| Evaluation result | Adequacy for component | 5 | 5 | 5 | 5 |
|  | Straight line shape | 5 | 5 | 5 | 5 |
|  | Blurring | 4 | 4 | 4 | 4 |

TABLE 2-continued

|  |  | Example 43 | Example 44 | Example 45 | Example 46 |
|---|---|---|---|---|---|
| Alkylamide solvent (a1) | N,N-Diethylformamide | 15.0 | 15.0 | 15.0 | 15.0 |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 68.5 | 68.5 | 68.4 | 66.0 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black |  |  | 0.5 |  |
|  | Cyan pigment (P.B.15:4) | 0.5 |  | 0.1 |  |
|  | Magenta pigment (P.R.122) |  | 0.5 |  |  |
|  | Yellow pigment (P.Y.155) |  |  |  |  |
|  | Yellow pigment (P.Y.150) |  |  |  | 3.0 |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.3 | 0.2 | 0.2 | 0.4 |
|  | Content of impurities derived from organic solvent (a) | 0.20 | 0.20 | 0.20 | 0.25 |
|  | Content of impurities derived from dialkyl glycol ether | 0.13 | 0.28 | 0.16 | 0.13 |
| Evaluation result | Adequacy for component | 5 | 5 | 5 | 5 |
|  | Straight line shape | 5 | 5 | 5 | 5 |
|  | Blurring | 4 | 4 | 4 | 4 |

|  |  | Example 47 | Example 48 | Example 49 | Example 50 |
|---|---|---|---|---|---|
| Alkylamide solvent (a1) | N,N-Diethylformamide | 15.0 | 15.0 | 15.0 | 15.0 |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 66.5 | 66.5 | 66.0 | 66.0 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  |  |  |

TABLE 2-continued

|  |  |  |  |  |  |
|---|---|---|---|---|---|
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  |  |  |
| Pigment | Carbon black |  |  |  |  |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) | 2.5 |  |  |  |
|  | Orange pigment (P.O.71) |  | 2.5 |  |  |
|  | Green pigment (P.G.36) |  |  | 3.0 |  |
|  | Green pigment (P.G.58) |  |  |  | 3.0 |
|  | Red pigment (P.R.254) |  |  |  |  |
|  | White pigment (titanium oxide) |  |  |  |  |
|  | Total | 100.0 | 100.0 | 100.0 | 100.0 |
|  | Water content | 0.5 | 0.1 | 0.3 | 0.4 |
|  | Content of impurities derived from organic solvent (a) | 0.19 | 0.22 | 0.15 | 0.12 |
|  | Content of impurities derived from dialkyl glycol ether | 0.24 | 0.13 | 0.16 | 0.21 |
| Evaluation result | Adequacy for component | 5 | 5 | 5 | 5 |
|  | Straight line shape | 5 | 5 | 5 | 5 |
|  | Blurring | 4 | 4 | 4 | 4 |

|  |  | Example 51 | Example 52 | Comp Example 53 | Comp Example 54 |
|---|---|---|---|---|---|
| Alkylamide solvent (a1) | N,N-Diethylformamide | 15.0 | 15.0 |  |  |
|  | N,N-Diethylpropanamide |  |  |  |  |
|  | N,N-Diethylacetamide |  |  |  |  |
| Cyclic amide solvent (a2) | ε-Caprolactam |  |  |  |  |
|  | N-Methylcaprolactam |  |  |  |  |
|  | N-Vinylcaprolactam |  |  |  |  |
| Lactone solvent (a3) | γ-Butyrolactone |  |  |  |  |
|  | γ-Valerolactone |  |  |  |  |
|  | δ-Valerolactone |  |  |  |  |
|  | δ-Hexanolactone |  |  |  |  |
|  | ε-Caprolactone |  |  |  |  |
| Additional solvent | Diethylene glycol methyl ethyl ether | 66.0 | 54.0 | 65.9 | 75.9 |
|  | Diethylene glycol diethyl ether |  |  |  |  |
|  | Diethylene glycol dibutyl ether |  |  |  |  |
|  | Dipropylene glycol dimethyl ether |  |  |  |  |
|  | Triethylene glycol mono-n-butyl ether |  |  |  |  |
|  | Tetraethylene glycol monobutyl ether |  |  |  |  |
|  | Dipropylene glycol monomethyl ether | 10.0 | 10.0 | 10.0 | 10.0 |
|  | Propylene carbonate |  |  |  |  |
|  | Ethylene glycol monobutyl ether acetate |  |  |  |  |
|  | 3-Methoxy-N,N-dimethylpropanamide |  |  | 15.0 | 5.0 |
| Resin | Acrylic resin | 3.0 | 3.0 | 3.0 | 3.0 |
|  | Vinyl chloride-vinyl acetate copolymer | 1.5 | 1.5 | 1.5 | 1.5 |
| Dispersant | Solsperse32000 | 1.5 | 1.5 | 1.5 | 1.5 |
| Additive | Polyether-modified polydimethylsiloxane |  |  | 0.1 | 0.1 |
| Pigment | Carbon black |  |  | 3.0 | 3.0 |
|  | Cyan pigment (P.B.15:4) |  |  |  |  |
|  | Magenta pigment (P.R.122) |  |  |  |  |
|  | Yellow pigment (P.Y.155) |  |  |  |  |
|  | Yellow pigment (P.Y.150) |  |  |  |  |
|  | Orange pigment (P.O.43) |  |  |  |  |
|  | Orange pigment (P.O.71) |  |  |  |  |
|  | Green pigment (P.G.36) |  |  |  |  |
|  | Green pigment (P.G.58) |  |  |  |  |
|  | Red pigment (P.R.254) | 3.0 |  |  |  |
|  | White pigment (titanium oxide) |  | 15.0 |  |  |
|  | Total | 100.0 | 100.0 | 100.0 | 100.0 |
|  | Water content | 0.2 | 0.7 | 0.4 | 0.2 |
|  | Content of impurities derived from organic solvent (a) | 0.10 | 0.42 |  |  |
|  | Content of impurities derived from dialkyl glycol ether | 0.19 | 0.24 | 0.12 | 0.15 |
| Evaluation result | Adequacy for component | 5 | 5 | 1 | 1 |
|  | Straight line shape | 5 | 5 | 4 | 4 |
|  | Blurring | 4 | 4 | 4 | 3 |

TABLE 2-continued

| | | Comp Example 55 | Comp Example 56 | Comp Example 57 |
|---|---|---|---|---|
| Alkylamide solvent (a1) | N,N-Diethylformamide | | | |
| | N,N-Diethylpropanamide | | | |
| | N,N-Diethylacetamide | | | |
| Cyclic amide solvent (a2) | ε-Caprolactam | | | |
| | N-Methylcaprolactam | | | |
| | N-Vinylcaprolactam | | | |
| Lactone solvent (a3) | γ-Butyrolactone | | | |
| | γ-Valerolactone | | | |
| | δ-Valerolactone | | | |
| | δ-Hexanolactone | | | |
| | ε-Caprolactone | | | |
| Additional solvent | Diethylene glycol methyl ethyl ether | 80.9 | | 80.9 |
| | Diethylene glycol diethyl ether | | 80.9 | |
| | Diethylene glycol dibutyl ether | | | |
| | Dipropylene glycol dimethyl ether | | | |
| | Triethylene glycol mono-n-butyl ether | | | |
| | Tetraethylene glycol monobutyl ether | | | |
| | Dipropylene glycol monomethyl ether | 10.0 | 10.0 | |
| | Propylene carbonate | | | 10.0 |
| | Ethylene glycol monobutyl ether acetate | | | |
| | 3-Methoxy-N,N-dimethylpropanamide | | | |
| Resin | Acrylic resin | 3.0 | 3.0 | 3.0 |
| | Vinyl chloride-vinyl acetate copolymer | 1.5 | 1.5 | 1.5 |
| Dispersant | Solsperse32000 | 1.5 | 1.5 | 1.5 |
| Additive | Polyether-modified polydimethylsiloxane | 0.1 | 0.1 | 0.1 |
| Pigment | Carbon black | 3.0 | 3.0 | 3.0 |
| | Cyan pigment (P.B.15:4) | | | |
| | Magenta pigment (P.R.122) | | | |
| | Yellow pigment (P.Y.155) | | | |
| | Yellow pigment (P.Y.150) | | | |
| | Orange pigment (P.O.43) | | | |
| | Orange pigment (P.O.71) | | | |
| | Green pigment (P.G.36) | | | |
| | Green pigment (P.G.58) | | | |
| | Red pigment (P.R.254) | | | |
| | White pigment (titanium oxide) | | | |
| | Total | 100.0 | 100.0 | 100.0 |
| | Water content | 0.4 | 0.4 | 0.3 |
| | Content of impurities derived from organic solvent (a) | | | |
| | Content of impurities derived from dialkyl glycol ether | 0.16 | 0.18 | 0.24 |
| Evaluation result | Adequacy for component | 5 | 5 | 5 |
| | Straight line shape | 2 | 1 | 2 |
| | Blurring | 1 | 1 | 1 |

As is evident from the tables, the nonaqueous ink compositions containing the organic solvent (a) (Examples) were less likely to cause blurring and did not erode the cured adhesive material, which resulted in prevention of a reduction in their ejection stability and resulted in effective prevention of the failure of ejection of them onto the desired position on the surface of the substrate. Moreover, Examples 38 to 52 containing colorants of different colors showed the same results as those of Example 3 containing carbon black.

A comparison was made between nonaqueous ink composition examples containing 15.0 mass % of the organic solvent (a), such as Examples 3, 7, and 9 (containing the alkylamide solvent (a1)), Examples 12, 14, and 15 (containing the cyclic amide solvent (a2)), and Examples 16 to 19 and 22 (containing the lactone solvent (a3)). As a result, Examples 3, 7, 9, 12, 14, 15, 18, 19, and 22, which contain the alkylamide solvent (a1), the cyclic amide solvent (a2), or a six- or more-membered ring lactone solvent as the organic solvent (a), were found to have a better adequacy for component than Example 16 or 17, which contains a five-membered ring lactone solvent.

A comparison was also made between nonaqueous ink composition examples containing 15.0 mass % of the organic solvent (a), such as Examples 3, 7, and 9 (containing the alkylamide solvent (a1)), Examples 12, 14, and 15 (containing the cyclic amide solvent (a2)), and Examples 16 to 19 and 22 (containing the lactone solvent (a3)). As a result, Examples 3, 7, 9, 12, 14, 15, 16, and 17, which contain the alkylamide solvent (a1), the cyclic amide solvent (a2), or a five-membered ring lactone solvent as the organic solvent (a), were found to enable printing of straight lines with a better shape than Example 18, 19, or 22, which contains a six- or more-membered ring lactone solvent. In particular, Examples 3, 7, and 9, which contain the alkylamide solvent (a1), were found to enable printing of straight lines with a particularly better shape.

A comparison was further made between Examples 1 to 4, which contain diethylformamide (the alkylamide solvent (a1)) as the organic solvent (a). As a result, Examples 2, 3, and 4, which contain at most 25.0 mass % of the organic solvent (a), were found to have a particularly better adequacy for component and evaluated as enabling particularly better printing.

On the other hand, Examples 53 and 54, which contain an alkoxyalkylamide solvent instead of the organic solvent (a), had a lower adequacy for component than Examples 1 to 52.

Moreover, Examples 55 to 57, which neither contain the organic solvent (a) nor the alkoxyalkylamide solvent, caused blurring and provided printing of straight lines with a worse shape than Examples 1 to 52.

Evaluation 2

The nonaqueous ink compositions of Examples 3, 16, 53, and 55 were evaluated for intermittent ejection performance, ejection stability, and blurring using the inkjet printer including: the member (head cap) that covers the face of the ejection port for ejecting the ink composition; the inkjet head containing a cured epoxy resin adhesive or a cured urethane resin adhesive; and the ink storage mechanism (damper). The component and the ink storage mechanism were attached and detached as needed for the evaluation.

Intermittent Ejection Performance

The nonaqueous ink compositions of Examples 3, 16, 53, and 55 were evaluated for intermittent ejection performance. Specifically, each of the nonaqueous ink compositions of Examples 3, 16, 53, and 55 was loaded in the inkjet printer and used to intermittently print in high-quality mode (at a printing speed of 10 m²/h) or high-speed mode (at a printing speed of 30 m²/h) on a recording medium (an adhesive polyvinyl chloride film (IMAGin JT5829R manufactured by MACtac)) at a substrate surface temperature of 30° C., 40° C., or 50° C. over a long period of time under room temperature conditions, during which the presence or absence of dot missing, misdirection, and ink splattering was observed, and the occurrences of dot missing, misdirection, and ink splattering were counted and evaluated. In this test, the evaluation of intermittent ejection performance was made using the inkjet head having components bonded together with an epoxy resin adhesive (in the table, "Epoxy" is filled in the "Head adhesive" column) and the inkjet head having components bonded together with a urethane resin adhesive (in the table, "Urethane" is filled in the "Head adhesive" column), which were exchanged.

Rating 5: The number of occurrences of dot missing, misdirection, or ink splattering is less than 10 during a test period of 24 hours.
Rating 4: The number of occurrences of dot missing, misdirection, or ink splattering is 10 or more and less than 20 during a test period of 24 hours.
Rating 3: The number of occurrences of dot missing, misdirection, or ink splattering is 20 or more and less than 30 during a test period of 24 hours.
Rating 2: The number of occurrences of dot missing, misdirection, or ink splattering is 30 or more and less than 40 during a test period of 24 hours.
Rating 1: The number of occurrences of dot missing, misdirection, or ink splattering is 40 or more during a test period of 24 hours.

Ejection Stability

The nonaqueous ink compositions of Examples 3, 16, 53, and 55 were evaluated for ejection stability. Specifically, each of the nonaqueous ink compositions of Examples 3, 16, 53, and 55 was loaded in the inkjet printer and used to continuously print, in reciprocal high-quality mode (at a printing speed of 10 m²/h) or reciprocal high-speed mode (at a printing speed of 30 m²/h), a solid image and fine lines on a recording medium (an adhesive polyvinyl chloride film (IMAGin JT5829R manufactured by MACtac)) at a substrate surface temperature of 40° C., during which the presence or absence of dot missing, misdirection, and ink splattering was observed, and the occurrences of dot missing, misdirection, and ink splattering were counted. In this test, the evaluation of ejection stability was made using the inkjet head having components bonded together with an epoxy resin adhesive (in the table, "Epoxy" is filled in the "Head adhesive" column) and the inkjet head having components bonded together with a urethane resin adhesive (in the table, "Urethane" is filled in the "Head adhesive" column), which were exchanged.

Rating 5: The number of occurrences of dot missing, misdirection, or ink splattering is less than 5 during a test period of 3 hours.
Rating 4: The number of occurrences of dot missing, misdirection, or ink splattering is 5 or more and less than 10 during a test period of 3 hours.
Rating 3: The number of occurrences of dot missing, misdirection, or ink splattering is 10 or more and less than 15 during a test period of 3 hours.
Rating 2: The number of occurrences of dot missing, misdirection, or ink splattering is 15 or more and less than 20 during a test period of 3 hours.
Rating 1: The number of occurrences of dot missing, misdirection, or ink splattering is 20 or more during a test period of 3 hours.

Evaluation of Blurring

The nonaqueous ink compositions of Examples 3, 16, 53, and 55 were evaluated for blurring. Specifically, each of the nonaqueous ink compositions of Examples 3, 16, 53, and 55 was loaded in the inkjet printer and used to print, in high-quality mode (at a printing speed of 10 m²/h) or high-speed mode (at a printing speed of 30 m²/h), an image consisting of: a solid background of a given color; and 6-point letters of a different color on the background on a recording medium (an adhesive polyvinyl chloride film (IMAGin JT5829R manufactured by MACtac)) at a substrate surface temperature of 40° C. The resulting recorded product was dried in an oven at 60° C. for 5 minutes, and then it was visually observed whether and how the recorded product blurred. In this test, the evaluation of blurring was made using the inkjet head having components bonded together with an epoxy resin adhesive (in the table, "Epoxy" is filled in the "Head adhesive" column) and the inkjet head having components bonded together with a urethane resin adhesive (in the table, "Urethane" is filled in the "Head adhesive" column), which were exchanged.

Evaluation Criteria

Rating 4: No ink blurring is observed, and the 6-point letters are clear.
Rating 3: Slight ink blurring is observed with no esthetic damage.
Rating 2: Ink blurring is observed while the 6-point letters are identifiable.
Rating 1: Significant ink blurring is observed, and the 6-point letters are not visually identifiable.

TABLE 3

| Nonaqueous ink composition | Example 3 | Example 3 | Example 3 | Example 3 | Example 3 | Example 3 | Example 3 |
| --- | --- | --- | --- | --- | --- | --- | --- |
| Printing mode | High quality (10 m2/h) | High quality (10 m2/h) | High speed (30 m2/h) | High speed (30 m2/h) | High speed (30 m2/h) | High speed (30 m2/h) | High speed (30 m2/h) |

TABLE 3-continued

| Head adhesive | Epoxy | Epoxy | Epoxy | Urethane | Epoxy | Epoxy | Epoxy |
|---|---|---|---|---|---|---|---|
| Head cap | Present | Present | Present | Present | Present | Absent | Absent |
| Ink storage mechanism (damper mechanism) | Present | Absent | Present | Present | Absent | Present | Absent |
| Intermittent ejection performance (substrate temperature 30° C.) | 5 | 5 | 5 | 3 | 5 | 4 | 4 |
| Intermittent ejection performance (substrate temperature 40° C.) | 5 | 5 | 5 | 3 | 5 | 2 | 2 |
| Intermittent ejection performance (substrate temperature 50° C.) | 5 | 5 | 5 | 3 | 5 | 2 | 2 |
| Ejection stability | 5 | 5 | 5 | 3 | 3 | 5 | 3 |
| Blurring | 4 | 4 | 3 | 3 | 3 | 3 | 3 |

| Nonaqueous ink composition | Example 53 | Example 53 | Example 53 | Example 55 | Example 55 | Example 55 |
|---|---|---|---|---|---|---|
| Printing mode | High speed (30 m2/h) | High speed (30 m2/h) | High speed (30 m2/h) | High speed (30 m2/h) | High speed (30 m2/h) | High speed (30 m2/h) |
| Head adhesive | Epoxy | Epoxy | Epoxy | Epoxy | Epoxy | Epoxy |
| Head cap | Present | Present | Absent | Present | Present | Absent |
| Ink storage mechanism (damper mechanism) | Present | Absent | Present | Present | Absent | Present |
| Intermittent ejection performance (substrate temperature 30° C.) | 4 | 4 | 2 | 4 | 4 | 3 |
| Intermittent ejection performance (substrate temperature 40° C.) | 3 | 3 | 2 | 3 | 3 | 2 |
| Intermittent ejection performance (substrate temperature 50° C.) | 2 | 2 | 1 | 3 | 3 | 2 |
| Ejection stability | 4 | 2 | 4 | 4 | 2 | 4 |
| Blurring | 3 | 3 | 3 | 1 | 1 | 1 |

As is evident from Table 3, the intermittent ejection performance was particularly good when the nonaqueous ink composition containing the organic solvent (a) (Example 3 or 16) was ejected onto the surface of the substrate from the inkjet head having the member that covers the face of the ejection port. On the other hand, the intermittent ejection performance was not sufficient when the nonaqueous ink composition of Example 53, which contains an alkoxyalkylamide solvent instead of the organic solvent (a), was ejected onto the surface of the substrate from the inkjet head having the member that covers the face of the ejection port.

It is also apparent that the ejection stability was particularly good when the nonaqueous ink composition containing the organic solvent (a) (Example 3 or 16) was ejected onto the surface of the substrate from the inkjet head having the ink storage mechanism. On the other hand, the ejection stability was not sufficient when the nonaqueous ink composition of Example 55, which contains an alkoxyalkylamide solvent instead of the organic solvent (a), was ejected onto the surface of the substrate from the inkjet head having the member that covers the face of the ejection port.

The intermittent ejection performance and the ejection stability were rated "3" when the nonaqueous ink composition containing the organic solvent (a) (Example 3 or 16) was ejected onto the surface of the substrate from the inkjet head having components bonded together with a urethane resin adhesive. This is probably because the nonaqueous ink composition containing the organic solvent (a) (Example 3 or 16) caused, for example, swelling of the urethane resin adhesive, which made the ejection pressure unstable. This indicates that the ejection stability of the ink composition can be particularly improved by using the nonaqueous ink composition containing the organic solvent (a) (Example 3 or 16) and using the inkjet head having components bonded together with an epoxy resin adhesive to eject the ink composition onto the surface of the substrate.

When the nonaqueous ink composition containing the organic solvent (a) (Example 3 or 16) was ejected to record on the surface of the substrate being fed in high-speed printing mode (at a printing speed of 30 m²/h), the print blurring was rated "3", which means that the recorded product slightly blurred as compared with that obtained in high-quality printing mode (at a printing speed of 10 m²/h). However, there was no aesthetic damage to the recorded product, which indicates that the nonaqueous ink composition can withstand recording on the recording medium (substrate) being fed at high speed.

Moreover, even when the substrate temperature was raised to 50° C. by the heating mechanism, good intermittent ejection performance was achieved by using the inkjet head having the ejection port face-covering member (head cap) and ejecting the nonaqueous ink composition of Example 3 or 16 onto the surface of the substrate. This indicates that the recording method that includes ejecting the organic solvent (a)-containing nonaqueous ink composition onto the surface of the substrate from the inkjet head having the ejection port face-covering member enables extremely high speed production of recorded products because the ejection port face-covering component can prevent drying of the ink composition in the vicinity of the ejection port and thus prevent a reduction in the intermittent ejection performance and because the ink composition can rapidly dry when landed on the substrate (recording medium).

The ejection stability was rated "3" when the inkjet head having no ink storage mechanism was used to eject the nonaqueous ink composition (Example 3 or 16) onto the surface of the substrate being fed in high-speed printing mode (at a printing speed of 30 m²/h) This is probably because the high-speed printing made the ink ejection pressure unstable due to the high feed rate of the carriage. On the other hand, the ejection stability was rated "5" when the inkjet head having an ink storage mechanism was used to eject the nonaqueous ink composition (Example 3 or 16) onto the surface of the substrate being fed in high-speed printing mode (at a printing speed of 30 m²/h). This indicates that using the inkjet recording device having the ink storage mechanism between the ink supply unit and the inkjet head to eject the ink composition onto the surface of the substrate makes it possible to stabilize the ink ejection pressure and to maintain the stability of ejection of the ink composition.

2. Preparation of Aqueous Ink Compositions

Aqueous ink compositions (Examples and Comparative Examples) were prepared each including the colorant (pigment dispersion), the resin (resin emulsion), the organic solvent (a), the additional solvent, and water (ion-exchanged water) in the proportion shown in the table below. The pigment dispersion and the resin (resin emulsion) were prepared by the methods shown below. Before the mixing, the concentration of impurities in the organic solvent (a) was determined by gas chromatography.

(1) Preparation of Pigment Dispersion

A mixture of 63 g of methyl methacrylate, 27 g of butyl acrylate, 30 g of butyl methacrylate, 15 g of acrylic acid, 15 g of methacrylic acid, and 3.6 g of tert-butyl peroxy-2-ethylhexanoate was added dropwise over 1.5 hours to 200 g of toluene kept at 100° C. After the dropwise addition was completed, the mixture was reacted at 100° C. for 2 hours. The reaction mixture was then cooled to give a resin solution. The resin solution was subjected to purification with hexane to give a resin with a weight average molecular weight (polystyrene-equivalent value) of 20,000 and an acid value of 143 mgKOH/g for pigment dispersion.

In 80 g of water (ion-exchanged water) were dissolved 2.5 g of the resulting resin for pigment dispersion and 0.6 g of N,N-dimethylaminoethanol. To the resulting solution were added 15 g of C.I. Pigment 122 and 0.05 g of an antifoaming agent (SURFYNOL 104 PG manufactured by Air Products), and they were dispersed with zirconia beads in a paint shaker to form a pigment dispersion.

(2) Preparation of Resin Emulsion

After a flask equipped with a mechanical stirrer, a thermometer, a nitrogen gas inlet tube, a reflux tube, and a dropping funnel was sufficiently purged with nitrogen gas, 0.75 g of a reactive surfactant (LATEMUL PD-104 (trade name) manufactured by Kao Corporation), 0.04 g of potassium persulfate, 1.5 g of methacrylic acid, and 150 g of pure water were added to the flask and mixed by stirring at 25° C. A mixture of 115.5 g of methyl methacrylate, 18 g of 2-ethylhexyl acrylate, and 15 g of butyl acrylate was added dropwise to the resulting mixture to form a pre-emulsion. After a flask equipped with a mechanical stirrer, a thermometer, a nitrogen gas inlet tube, a reflux tube, and a dropping funnel was sufficiently purged with nitrogen gas, 3 g of a reactive surfactant (LATEMUL PD-104 (trade name) manufactured by Kao Corporation), 0.01 g of potassium persulfate, and 200 g of pure water were added to the flask and mixed by stirring at 70° C. Subsequently, the prepared pre-emulsion was added dropwise to the flask over 3 hours. After the resulting product was further aged by heating at 70° C. for 3 hours and then cooled, the pH of the product was adjusted to 8 with N,N-dimethylethanolamine. The product was then filtered with a #150 mesh (manufactured by Nippon Fabric Inc.) to give 500 g of a resin emulsion with a solid content of 30 mass % (glass transition temperature: 64° C., acid value: 7 mgKOH/g, volume average particle diameter: 90 nm). The volume average particle diameter (D50) of the resin emulsion was measured under 25° C. conditions using a particle size distribution measurement system (Nanotrac Wave (a particle size analyzer manufactured by MicrotracBEL Corporation)).

Evaluation 1

The aqueous ink compositions (Examples and Comparative Examples) were subjected to evaluation of adequacy for component, evaluation of the shape of printed straight line, and evaluation of blurring as in Evaluation 1 of the nonaqueous ink compositions described above.

TABLE 4

| | | Examples | | | | | Comparative Examples | |
|---|---|---|---|---|---|---|---|---|
| | Components | Example 58 | Example 59 | Example 60 | Example 61 | Example 62 | Example 63 | Example 64 |
| Alkylamide solvent (a1) | N,N-Diethylformamide | 10.0 | | | | | | |
| Cyclic amide solvent (a2) | ε-Caprolactam | | 10.0 | 10.0 | | | | |
| Lactone solvent (a3) | γ-Butyrolactone | | | | 10.0 | | | |
| | ε-Caprolactone | | | | | 10.0 | | |
| Additional solvent | Propylene glycol | 20.0 | 20.0 | 20.0 | 20.0 | 20.0 | 20.0 | 30.0 |
| | 3-Methoxy-N,N-dimethyl-propanamide | | | | | | 10.0 | |
| | Water | 32.5 | 32.5 | 32.5 | 32.5 | 32.5 | 32.5 | 32.5 |
| Acrylic resin | Resin emulsion | 17.0 | 17.0 | 17.0 | 17.0 | 17.0 | 17.0 | 17.0 |
| Additive | Polysiloxane compound | 0.5 | 0.5 | 0.5 | 0.5 | 0.5 | 0.5 | 0.5 |
| Pigment dispersion | Magenta pigment dispersion | 20.0 | 20.0 | 20.0 | 20.0 | 20.0 | 20.0 | 20.0 |
| | Total | 100.0 | 100.0 | 100.0 | 100.0 | 100.0 | 100.0 | 100.0 |
| | Content of impurities derived from organic solvent (a) | 0.12 | 0.21 | 0.75 | 0.23 | 0.25 | 0.27 | 0.15 |
| Evaluation result | Adequacy for component | 5 | 5 | 2 | 2 | 4 | 1 | 5 |

TABLE 4-continued

|  | Examples | | | | | Comparative Examples | |
|---|---|---|---|---|---|---|---|
| Components | Example 58 | Example 59 | Example 60 | Example 61 | Example 62 | Example 63 | Example 64 |
| Straight line shape | 5 | 5 | 4 | 4 | 4 | 2 | 3 |
| Blurring | 4 | 4 | 2 | 4 | 3 | 3 | 1 |

As is evident from the table, the aqueous ink compositions containing the organic solvent (a) (Examples) did not erode the cured adhesive material used to bond components of the inkjet head, which resulted in prevention of a reduction in the ejection stability of the aqueous ink composition and resulted in effective prevention of the failure of ejection of the aqueous ink composition onto the desired position on the surface of the substrate.

In particular, Examples 58, 59, and 62, which contain the alkylamide solvent (a1), the cyclic amide solvent (a2), or a six- or more-membered ring lactone solvent as the organic solvent (a), had a better adequacy for component than Example 61, which contains a five-membered ring lactone solvent, and Examples 58 and 59, which contain the alkylamide solvent (a1) or the cyclic amide solvent (a2) as the organic solvent (a), had a particularly better adequacy for component.

Examples 58 and 59, which contain the alkylamide solvent (a1) or the cyclic amide solvent (a2), was found to enable printing of straight lines with a particularly better shape.

The aqueous ink composition of Example 59, which has the same proportion of components as Example 60 and has a lower concentration of impurities derived from the organic solvent (a) than Example 60, had a better adequacy for component, enabled printing of straight lines with a better shape, and was less likely to cause blurring than Example 60.

On the other hand, Example 63, which contains an alkoxyalkylamide solvent instead of the organic solvent (a), had a lower adequacy for component than Examples 58 to 62, although it did not cause blurring.

Example 64, which neither contains the organic solvent (a) nor the alkoxyalkylamide solvent, caused blurring and provided printing of straight lines with a worse shape than Examples 58 to 62, although it had a good adequacy for component.

Evaluation 2

The aqueous ink compositions of Examples 58, 61, 63, and 64 were evaluated for intermittent ejection performance, ejection stability, and blurring as in Evaluation 2 of the nonaqueous ink compositions described above.

TABLE 5

| Aqueous ink composition | Example 58 | Example 58 | Example 58 | Example 58 | Example 58 | Example 58 | Example 58 |
|---|---|---|---|---|---|---|---|
| Printing mode | High quality (10 m2/h) | High quality (10 m2/h) | High speed (30 m2/h) | High speed (30 m2/h) | High speed (30 m2/h) | High speed (30 m2/h) | High speed (30 m2/h) |
| Head adhesive | Epoxy | Epoxy | Epoxy | Urethane | Epoxy | Epoxy | Epoxy |
| Head cap | Present | Present | Present | Present | Present | Absent | Absent |
| Ink storage mechanism (damper mechanism) | Present | Absent | Present | Present | Absent | Present | Absent |
| Intermittent ejection performance (substrate temperature 30° C.) | 5 | 5 | 5 | 3 | 5 | 4 | 4 |
| Intermittent ejection performance (substrate temperature 40° C.) | 5 | 5 | 5 | 3 | 5 | 2 | 2 |
| Intermittent ejection performance (substrate temperature 50° C.) | 5 | 5 | 5 | 3 | 5 | 2 | 2 |
| Ejection stability | 5 | 5 | 5 | 3 | 3 | 5 | 3 |
| Blurring | 4 | 4 | 3 | 3 | 3 | 3 | 3 |

| Aqueous ink composition | Example 63 | Example 63 | Example 63 | Example 64 | Example 64 | Example 64 |
|---|---|---|---|---|---|---|
| Printing mode | High speed (30 m2/h) | High speed (30 m2/h) | High speed (30 m2/h) | High speed (30 m2/h) | High speed (30 m2/h) | High speed (30 m2/h) |
| Head adhesive | Epoxy | Epoxy | Epoxy | Epoxy | Epoxy | Epoxy |
| Head cap | Present | Present | Absent | Present | Present | Absent |
| Ink storage mechanism (damper mechanism) | Present | Absent | Present | Present | Absent | Present |
| Intermittent ejection performance (substrate temperature 30° C.) | 4 | 4 | 2 | 4 | 4 | 3 |
| Intermittent ejection performance (substrate temperature 40° C.) | 3 | 3 | 2 | 3 | 3 | 2 |

TABLE 5-continued

| Intermittent ejection performance (substrate temperature 50° C.) | 2 | 2 | 1 | 3 | 3 | 2 |
|---|---|---|---|---|---|---|
| Ejection stability | 4 | 2 | 4 | 4 | 2 | 4 |
| Blurring | 2 | 2 | 2 | 1 | 1 | 1 |

As is evident from Table 5, the intermittent ejection performance was particularly good when the aqueous ink composition containing the organic solvent (a) (Example 58 or 61) was ejected onto the surface of the substrate from the inkjet head having the member that covers the face of the ejection port. On the other hand, the intermittent ejection performance was not sufficient when Example 63, which contains an alkoxyalkylamide solvent instead of the organic solvent (a), or Example 64, which neither contains the organic solvent (a) nor the alkoxyalkylamide solvent, was ejected onto the surface of the substrate from the inkjet head having the member that covers the face of the ejection port.

It is also apparent that the ejection stability was particularly good when the aqueous ink composition containing the organic solvent (a) (Example 58 or 61) was ejected onto the surface of the substrate from the inkjet head having the ink storage mechanism. On the other hand, the ejection stability was not sufficient when Example 63, which contains an alkoxyalkylamide solvent instead of the organic solvent (a), or Example 64, which neither contains the organic solvent (a) nor the alkoxyalkylamide solvent, was ejected onto the surface of the substrate from the inkjet head having the member that covers the face of the ejection port.

The intermittent ejection performance and the ejection stability were rated "3" when the aqueous ink composition containing the organic solvent (a) (Example 58 or 61) was ejected onto the surface of the substrate from the inkjet head having components bonded together with a urethane resin adhesive. This is probably because the aqueous ink composition containing the organic solvent (a) (Example 58 or 61) caused, for example, swelling of the urethane resin adhesive, which made the ejection pressure unstable. This indicates that the ejection stability of the ink composition can be particularly improved by using the aqueous ink composition containing the organic solvent (a) (Example 58 or 61) and using the inkjet head having components bonded together with an epoxy resin adhesive to eject the ink composition onto the surface of the substrate.

When the aqueous ink composition containing the organic solvent (a) (Example 58 or 61) was ejected to record on the surface of the substrate being fed in high-speed printing mode (at a printing speed of 30 m²/h), the print blurring was rated "3", which means that the recorded product slightly blurred as compared with that obtained in high-quality printing mode (at a printing speed of 10 m²/h). However, there was no aesthetic damage to the recorded product, which indicates that the aqueous ink composition can withstand recording on the recording medium (substrate) being fed at high speed.

Moreover, even when the substrate temperature was raised to 50° C. by the heating mechanism, good intermittent ejection performance was achieved by using the inkjet head having the ejection port face-covering member (head cap) and ejecting the aqueous ink composition of Example 58 or 61 onto the surface of the substrate. This indicates that the recording method that includes ejecting the organic solvent (a)-containing aqueous ink composition onto the surface of the substrate from the inkjet head having the ejection port face-covering member enables extremely high speed production of recorded products because the ejection port face-covering component can prevent drying of the ink composition in the vicinity of the ejection port and thus prevent a reduction in the intermittent ejection performance and because the ink composition can rapidly dry when landed on the substrate (recording medium).

The ejection stability was rated "3" when the inkjet head having no ink storage mechanism was used to eject the aqueous ink composition (Example 58 or 61) onto the surface of the substrate being fed in high-speed printing mode (at a printing speed of 30 m²/h). This is probably because the high-speed printing made the ink ejection pressure unstable due to the high feed rate of the carriage. On the other hand, the ejection stability was rated "5" when the inkjet head having an ink storage mechanism was used to eject the aqueous ink composition (Example 58 or 61) onto the surface of the substrate being fed in high-speed printing mode (at a printing speed of 30 m²/h). This indicates that using the inkjet recording device having the ink storage mechanism between the ink supply unit and the inkjet head to eject the ink composition onto the surface of the substrate makes it possible to stabilize the ink ejection pressure and to maintain the stability of ejection of the ink composition.

The invention claimed is:

1. A recording method comprising ejecting an organic solvent-containing inkjet ink composition onto a surface of a substrate from an inkjet head comprising components bonded together with a cured adhesive material, the organic solvent comprising an organic solvent (a), wherein the organic solvent (a) is at least one selected from the group consisting of:

an alkylamide solvent (a1) that is represented by formula (1)

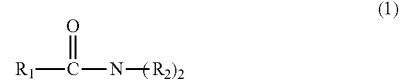

(1)

wherein in formula (1), $R_1$ represents hydrogen or an alkyl group having from one or more to four or less carbon atoms, and $R_2$ represents an alkyl group having from two or more to four or less carbon atoms, a cyclic amide solvent (a2), wherein the cyclic amide solvent (a2) is represented by formula (2):

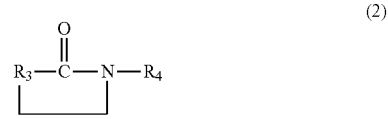

(2)

where $R_3$ represents an alkylene group having from four or more to five or less carbon atoms, and $R_4$ represents hydrogen, an alkyl group having from one or more to two or less carbon atoms, or an unsaturated hydrocarbon group, and a seven-membered ring lactone solvent (a3),
wherein the ink composition has a water content of 5.0 mass % or less based on the total mass of the ink composition, and
wherein the ink composition is not an active energy ray-curable ink composition.

2. The recording method according to claim 1, wherein an ink storage mechanism is provided between an ink supply unit supplying the ink composition and the inkjet head.

3. The recording method according to claim 1, wherein the adhesive used to bond the components of the inkjet head comprises an epoxy adhesive.

4. The recording method according to claim 3, wherein the inkjet head comprises a member that covers a face of an ejection port for ejecting the ink composition.

5. The recording method according to claim 3, wherein an ink storage mechanism is provided between an ink supply unit supplying the ink composition and the inkjet head.

6. The recording method according to claim 1, wherein the inkjet head comprises a member that covers a face of an ejection port for ejecting the ink composition.

7. The recording method according to claim 6, wherein an ink storage mechanism is provided between an ink supply unit supplying the ink composition and the inkjet head.

8. A method for producing a recorded product, the method comprising ejecting an organic solvent-containing inkjet ink composition onto a surface of a substrate from an inkjet head comprising components bonded together with a cured adhesive material,
the organic solvent comprising an organic solvent (a),
wherein the organic solvent (a) is at least one selected from the group consisting of:
an alkylamide solvent (a1) that is represented by formula (1)

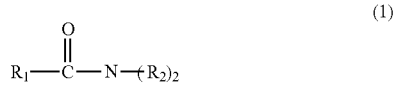

wherein in formula (1), $R_1$ represents hydrogen or an alkyl group having from one or more to four or less carbon atoms, and $R_2$ represents an alkyl group having from two or more to four or less carbon atoms,
a cyclic amide solvent (a2), wherein the cyclic amide solvent (a2) is represented by formula (2):

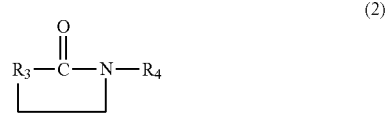

where $R_3$ represents an alkylene group having from four or more to five or less carbon atoms, and $R_4$ represents hydrogen, an alkyl group having from one or more to two or less carbon atoms, or an unsaturated hydrocarbon group, and
a seven-membered ring lactone solvent (a3),
wherein the ink composition has a water content of 5.0 mass % or less based on the total mass of the ink composition, and
wherein the ink composition is not an active energy ray-curable ink composition.

9. An inkjet ink composition to be ejected onto a surface of a substrate from an inkjet head comprising components bonded together with a cured adhesive material,
the ink composition comprising an organic solvent,
the organic solvent comprising an organic solvent (a),
wherein the organic solvent (a) is at least one selected from the group consisting of:
an alkylamide solvent (a1) that is represented by formula (1)

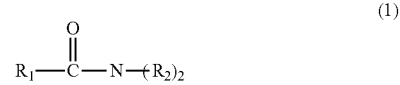

wherein in formula (1), $R_1$ represents hydrogen or an alkyl group having from one or more to four or less carbon atoms, and $R_2$ represents an alkyl group having from two or more to four or less carbon atoms,
a cyclic amide solvent (a2), wherein the cyclic amide solvent (a2) is represented by formula (2):

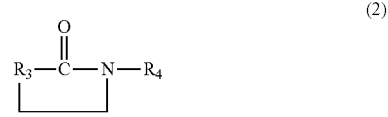

where $R_3$ represents an alkylene group having from four or more to five or less carbon atoms, and $R_4$ represents hydrogen, an alkyl group having from one or more to two or less carbon atoms, or an unsaturated hydrocarbon group, and
a seven-membered ring lactone solvent (a3),
wherein the ink composition has a water content of 5.0 mass % or less based on the total mass of the ink composition, and
wherein the ink composition is not an active energy ray-curable ink composition.

10. The ink composition according to claim 9, wherein the organic solvent (a) is the alkylamide solvent (a1).

11. The ink composition according to claim 10, wherein the alkylamide solvent (a1) comprises at least one selected from the group consisting of N,N-diethylformamide, N,N-diethylpropanamide, and N,N-diethylacetamide.

12. The ink composition according to claim 9, wherein the organic solvent (a) is the cyclic amide solvent (a2).

13. The ink composition according to claim 12, wherein the cyclic amide solvent (a2) comprises at least one selected from the group consisting of ε-caprolactam, N-methylcaprolactam, and N-vinylcaprolactam.

14. The ink composition according to claim 9, wherein the organic solvent (a) is the seven-membered ring lactone solvent (a3).

15. The ink composition according to claim 14, wherein the seven-membered ring lactone solvent (a3) is ε-caprolactone.

* * * * *